US011971670B2

(12) United States Patent
An et al.

(10) Patent No.: US 11,971,670 B2
(45) Date of Patent: Apr. 30, 2024

(54) IMAGE FORMING APPARATUS TO CONTROL TRANSFER VOLTAGE FOR SECONDARY TRANSFER TO RECORDING MATERIAL

(71) Applicant: CANON KABUSHIKI KAISHA, Tokyo (JP)

(72) Inventors: Koji An, Saitama (JP); Shinji Katagiri, Kanagawa (JP); Shuichi Tetsuno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/472,298

(22) Filed: Sep. 10, 2021

(65) Prior Publication Data

US 2022/0082965 A1 Mar. 17, 2022

(30) Foreign Application Priority Data

Sep. 16, 2020 (JP) ................................ 2020-155905

(51) Int. Cl.
*G03G 15/16* (2006.01)

(52) U.S. Cl.
CPC ....... *G03G 15/1675* (2013.01); *G03G 15/162* (2013.01)

(58) Field of Classification Search
CPC ........... G03G 15/1675; G03G 15/6558; G03G 15/162
See application file for complete search history.

(56) References Cited

U.S. PATENT DOCUMENTS 9,280,100 B2 * 3/2016 Matsuzaki ......... G03G 15/6532
2015/0338785 A1 * 11/2015 Ai ........................ G03G 15/161 399/101

(Continued)

FOREIGN PATENT DOCUMENTS

JP 2012098709 A 5/2012
JP 2013025221 A 2/2013

(Continued)

OTHER PUBLICATIONS

English translation of JP-2019045618-A (Year: 2019).*
English translation of JP-7195804-B2 (Year: 2022).*

*Primary Examiner* — Arlene Heredia
(74) *Attorney, Agent, or Firm* — Canon U.S.A., Inc. I.P. Division

(57) ABSTRACT

An image forming apparatus includes an intermediate transfer belt, an outer roller, a power source, and a regulation member. The outer roller transfers a toner image onto a recording material. The power source applies a voltage to the outer roller. The regulation member regulates orientation of the recording material. Information is acquired regarding a timing at which orientation of a recording material first portion, passing through the transfer portion that is located between the outer roller and the regulation member, can change to move closer to the intermediate transfer belt. Based on the acquired information, a transfer voltage target value for transfer onto the recording material is changed between a first target value of a period anterior to the timing and a second target value of a period posterior to the timing that is larger in absolute value than the first target value.

23 Claims, 14 Drawing Sheets

(56) References Cited

U.S. PATENT DOCUMENTS

| | | | | |
|---|---|---|---|---|
| 2016/0378024 | A1* | 12/2016 | Kimura | G03G 15/1675 399/66 |
| 2018/0217522 | A1* | 8/2018 | Yoshida | G03G 9/09 |
| 2018/0348690 | A1* | 12/2018 | Koizumi | G03G 15/6529 |

FOREIGN PATENT DOCUMENTS

| | | | | | |
|---|---|---|---|---|---|
| JP | 2015219471 | A | | 12/2015 | |
| JP | 2016071197 | A | | 5/2016 | |
| JP | 2017125995 | A | | 7/2017 | |
| JP | 2019045618 | A | * | 3/2019 | |
| JP | 7195804 | B2 | * | 12/2022 | G03G 15/1665 |

* cited by examiner

IMAGE FORMING APPARATUS TO CONTROL TRANSFER VOLTAGE FOR SECONDARY TRANSFER TO RECORDING MATERIAL

BACKGROUND OF THE DISCLOSURE

Field

The present disclosure relates to an image forming apparatus such as a printer, a copier, or a facsimile apparatus that uses an electrophotographic method or an electrostatic recording method.

Description of the Related Art

An example of image forming apparatuses that use the electrophotographic method is a conventional image forming apparatus that uses an intermediate transfer method. In such an image forming apparatus, a toner image formed on a photosensitive member serving as an image bearing member is primarily transferred onto an intermediate transfer member at a primary transfer portion, and then secondarily transferred from the intermediate transfer member onto a recording material such as paper at a secondary transfer portion. In a color image forming apparatus that uses the intermediate transfer method, a plurality of photosensitive members is arranged in a moving direction of an intermediate transfer member. Toner images of respective colors are primarily transferred from the plurality of photosensitive members onto the intermediate transfer member to be superimposed on one another. As the intermediate transfer member, an endless intermediate transfer belt stretched around a plurality of stretching rollers is widely used. The primary transfer is often performed by a primary transfer voltage being applied from a primary transfer power source to a primary transfer member provided on an opposite side of a photosensitive member across the intermediate transfer belt. The secondary transfer is often performed by a secondary transfer voltage being applied from a secondary transfer power source to a secondary transfer member being in contact with one of the plurality of stretching rollers via the intermediate transfer belt.

Japanese Patent Application Laid-Open No. 2012-98709 proposes a configuration in which primary transfer is performed by applying a voltage to a current supply member being in contact with an outer circumferential surface of an intermediate transfer belt. In the configuration, the intermediate transfer belt is a conductive belt that has low electric resistance (hereinafter, will be simply referred to as resistance) and has conductivity that enables a current flow from the current supply member in a circumferential direction. In addition, in the configuration, a current necessary for primary transfer is supplied from the current supply member to a plurality of photosensitive members via the intermediate transfer belt. In the configuration, a secondary transfer member can be used as the current supply member.

Nevertheless, in the case of using the low-resistance intermediate transfer belt having conductivity that enables the current flow in the circumferential direction as discussed in Japanese Patent Application Laid-Open No. 2012-98709, for example, if the orientation of a recording material changes when passing through a secondary transfer portion, a current flowing in the vicinity of the secondary transfer portion might change. This is because the current flowing in the secondary transfer portion is likely to flow into the vicinity of the secondary transfer portion due to low electric resistance of the intermediate transfer belt. If the current flowing in the secondary transfer portion changes in this manner, in a case where a secondary transfer voltage drops due to a change in load on a secondary transfer power source, a current necessary for secondarily transferring a toner image from the intermediate transfer belt onto the recording material becomes insufficient, and a transfer defect might occur.

SUMMARY OF THE DISCLOSURE

The present disclosure is directed to preventing an occurrence of a transfer defect attributed to a change in the orientation of a recording material conveyed in the vicinity of a secondary transfer portion in a configuration in which an intermediate transfer belt having conductivity that enables a current flow in the circumferential direction is used.

According to an aspect of the present disclosure, an image forming apparatus includes an image bearing member configured to bear a toner image, an intermediate transfer belt that is endless and is configured to form a primary transfer portion by being in contact with the image bearing member, wherein the toner image is primarily transferred onto the intermediate transfer belt from the image bearing member at the primary transfer portion, a plurality of stretching rollers configured to stretch the intermediate transfer belt, the plurality of stretching rollers including an inner roller, an outer roller configured to form a secondary transfer portion by being in contact with the intermediate transfer belt at a position facing the inner roller, and configured to secondarily transfer the toner image from the intermediate transfer belt onto a recording material at the secondary transfer portion, a power source configured to apply a voltage to the outer roller, a regulation member arranged upstream of the secondary transfer portion in a conveyance direction of the recording material, wherein the regulation member is configured to regulate orientation of the recording material by being in contact with the outer roller and the regulation member, and a control unit configured to control a secondary transfer voltage to be output by the power source for secondary transfer, wherein the intermediate transfer belt has conductivity enabling a current flow in a circumferential direction, and wherein the control unit controls to acquire information regarding a timing at which orientation of a first portion of the recording material, passing through the secondary transfer portion that is located between the outer roller and the regulation member, can change to move closer to the intermediate transfer belt and, based on the acquired information, controls to change a target value of the secondary transfer voltage for the secondary transfer onto the recording material between a first target value of a period anterior to the timing and a second target value of a period posterior to the timing that is larger in absolute value than the first target value.

Further features of the present disclosure will become apparent from the following description of exemplary embodiments with reference to the attached drawings.

DESCRIPTION OF THE EMBODIMENTS

Hereinafter, an image forming apparatus according to an exemplary embodiment of the present disclosure will be described in more detail with reference to the drawings.

1. Overall Configuration and Operation of Image Forming Apparatus

Figure 1:
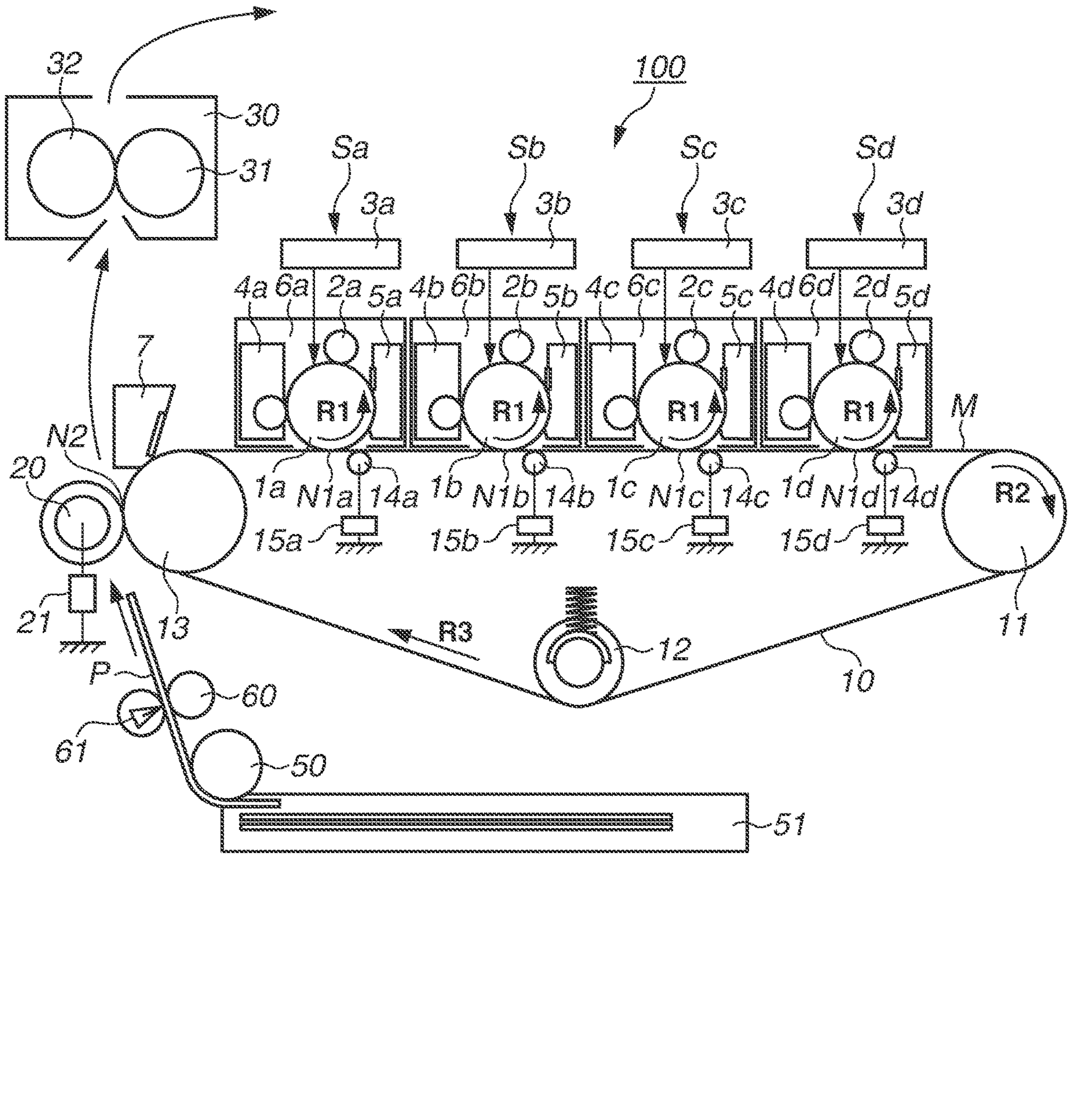
FIG. 1 is a schematic cross-sectional diagram of an image forming apparatus.

FIG. 1 is a schematic cross-sectional diagram of an image forming apparatus 100 according to a first exemplary embodiment. The image forming apparatus 100 according to the first exemplary embodiment is a full-color laser printer employing an inline method and an intermediate transfer method that can form a full-color image using an electrophotographic method. The image forming apparatus 100 can form a full-color image on a recording material P (e.g., recording paper, plastic sheet) based on image information. The image information is input to the image forming apparatus 100 from an image reading device provided in the image forming apparatus 100 or connected to the image forming apparatus 100, or a host device such as a personal computer connected to the image forming apparatus 100 in such a manner that communication can be performed.

The image forming apparatus 100 includes, as a plurality of image forming units, first, second, third, and fourth image forming units (stations) Sa, Sb, Sc, and Sd that respectively form yellow (Y), magenta (M), cyan (C), and black (K) toner images. In the first exemplary embodiment, the first, the second, the third, and the fourth image forming units Sa, Sb, Sc, and Sd are arranged in a row in a direction intersecting with a vertical direction. In the first, the second, the third, and the fourth image forming units Sa, Sb, Sc, and Sd, components having the same or corresponding function or configuration may be collectively described without letters a, b, c, and d added to the end of reference numerals for indicating colors of the stations in which the components are provided.

A photosensitive drum 1 being a rotatable drum-type (cylindrical) photosensitive member (electrophotographic photosensitive member) serving as an image bearing member bearing a toner image is driven to rotate in an arrow R1 direction (counterclockwise direction) indicated in FIG. 1, by driving force transmitted from a driving source (not illustrated) included in a driving unit. In the first exemplary embodiment, four photosensitive drums 1 are provided side by side in the direction intersecting with the vertical direction. The surface (outer circumferential surface) of the rotating photosensitive drum 1 is uniformly charged to a predetermined potential with predetermined polarity (negative polarity in the first exemplary embodiment) by a charging roller 2 being a roller type charging member serving as a charging unit. The charged surface of the photosensitive drum 1 is subjected to scanning exposure performed by an exposure device (laser scanner unit) 3 serving as an exposure unit, based on image information, and an electrostatic latent image (electrostatic image) corresponding to the image information is formed on the photosensitive drum 1. The exposure device 3 forms the electrostatic latent image on the photosensitive drum 1 by irradiating the surface of the photosensitive drum 1 with laser light based on an output calculated by a central processing unit (CPU) circuit unit to be described below, based on the image information input from the host device such as a personal computer. The electrostatic latent image formed on the photosensitive drum 1 is developed (visualized) with toner serving as developer that is supplied by a development device 4 serving as a development unit, and a toner image is formed on the photosensitive drum 1. In the first exemplary embodiment, toner charged to the same polarity (negative polarity in the first exemplary embodiment) as charging polarity of the photosensitive drum 1 adheres to an exposure portion (image portion) on the photosensitive drum 1 in which an absolute value of a potential is decreased as a result of the photosensitive drum 1 being exposed after being uniformly charged (reversal development). In the first exemplary embodiment, normal charging polarity of toner being charging polarity of toner at the time of development is negative polarity.

An intermediate transfer belt 10 that is an endless belt serving as an intermediate transfer member is arranged to face the four photosensitive drums 1. The intermediate transfer belt 10 is stretched with predetermined tensional force (tension) around a driving roller 11, a tension roller 12, and a secondary transfer opposing roller 13 that serve as a plurality of stretching rollers (support rollers). An image transfer surface M is formed between the secondary transfer opposing roller 13 and the driving roller 11. The intermediate transfer belt 10 rotates (revolves) in an arrow R3 direction (clockwise direction) indicated in FIG. 1, by the driving roller 11 being driven to rotate in an arrow R2 direction (clockwise direction) indicated in FIG. 1, by driving force transmitted from a driving source (not illustrated) included in the driving unit. Stretching rollers other than the driving roller 11 are driven to rotate along with the rotation of the intermediate transfer belt 10. On the inner circumferential surface of the intermediate transfer belt 10, primary transfer rollers 14 being roller type primary transfer members serving as primary transfer units are arranged corresponding to the respective photosensitive drums 1. By pressing the inner circumferential surface of the intermediate transfer belt 10 toward the photosensitive drum 1, each of the primary transfer rollers 14 forms a primary transfer nip (primary transfer portion) N1 at which the photosensitive drum 1 and the intermediate transfer belt 10 come into contact. At the time of image formation (at the time of primary transfer), at the primary transfer nip N1, a primary transfer current flows from the intermediate transfer belt 10 to the photosensitive drum 1 due to a potential difference (primary transfer potential) between the photosensitive drum 1 and the intermediate transfer belt 10. By the function of the primary transfer current, the toner image formed on the photosensitive drum 1 is primarily transferred onto the rotating intermediate transfer belt 10. The supply of the primary transfer current will be further described below. For example, when a full-color image is formed, toner images of yellow, magenta, cyan, and black colors that are formed on the respective photosensitive drums 1 are primarily transferred sequentially onto the intermediate transfer belt 10 to be superimposed on one another.

On the outer circumferential surface side of the intermediate transfer belt 10, a secondary transfer roller (outer roller) 20 being a roller type secondary transfer member serving as a secondary transfer unit is arranged at a position facing the secondary transfer opposing roller (inner roller) 13. The secondary transfer roller 20 is pressed against the secondary transfer opposing roller 13, comes into contact with the secondary transfer opposing roller 13 via the intermediate transfer belt 10, and forms a secondary transfer nip (secondary transfer portion) N2 at which the intermediate transfer belt 10 and the secondary transfer roller 20 come into contact. At the time of image formation (at the time of secondary transfer), at the secondary transfer nip N2, a secondary transfer current flows from the secondary transfer roller 20 to the intermediate transfer belt 10 due to a potential difference (secondary transfer potential) between the secondary transfer roller 20 and the intermediate transfer belt 10. By the function of the secondary transfer current, the toner image formed on the intermediate transfer belt 10 is secondarily transferred onto the recording material P that is conveyed while being pinched between the intermediate transfer belt 10 and the secondary transfer roller 20. The supply of the secondary transfer current will be further described below. Recording materials P are stored in a cassette 51 serving as a recording material storage portion. The recording materials P stored in the cassette 51 are picked up one by one by a feeding roller 50 being a feeding member serving as a feeding unit and fed out from the cassette 51. Each of the recording materials P fed out from the cassette 51 is conveyed to a registration roller pair 60 being a conveyance member serving as a conveyance unit. As described below in detail, the registration roller pair 60 conveys the recording material P to the secondary transfer nip N2 at a timing synchronized with the toner image on the intermediate transfer belt 10.

The recording material P on which the toner image has been transferred is conveyed to a fixing device 30 serving as a fixing unit. The fixing device 30 fixes (melts, settles) the toner image onto the recording material P by applying heat and pressure to the recording material P bearing the unfixed toner image. For example, when a full-color image is formed, by heat and pressure being applied to the recording material P in the fixing device 30, four-color toner on the recording material P is melted and mixed in color, and fixed onto the recording material P. In the first exemplary embodiment, the fixing device 30 includes a fixing roller 31 serving as a fixing member, and a pressing roller 32 serving as a pressing member that comes into pressure contact with the fixing roller 31. In the first exemplary embodiment, the fixing roller 31 is a roller having an outer diameter of 18 mm and being obtained by forming an elastic layer of insulating silicone rubber around a metal element tube and further covering the outer circumference of the elastic layer with an insulating perfluoroalkoxy alkane (PFA) tube. The fixing roller 31 includes a halogen heater (not illustrated) as a heating unit. The halogen heater is not in contact with the fixing roller 31, and generates heat by being supplied with a voltage from a power source (not illustrated). The pressing roller 32 is a roller having an outer diameter of 18 mm and being obtained by forming an elastic layer of conductive silicone rubber around a metal core and further covering the outer circumference of the elastic layer with a conductive PFA tube. By being pressed with a pressing force of 10 kgf, the fixing roller 31 and the pressing roller 32 form a fixing nip. The pressing roller 32 is driven to rotate by a motor (not illustrated), and the fixing roller 31 is driven and rotated by the rotation of the pressing roller 32. Then, the recording material P is conveyed while being pinched between the fixing roller 31 and the pressing roller 32 at the fixing nip. The metal core of the pressing roller 32 is connected to the ground via a 1000-MΩ resistive element. By letting out charges on the fixing roller 31 and the pressing roller 32 to the ground via the pressing roller 32 and the resistive element, it is possible to prevent the surfaces of the fixing roller 31 and the pressing roller 32 from being charged. The recording material P on which the toner image is fixed is discharged (output) to the outside of the image forming apparatus 100.

On the other hand, toner (primary transfer remaining toner) remaining on the photosensitive drum 1 after the primary transfer is removed and collected from the surface of the photosensitive drum 1 by a drum cleaning device 5 serving as a photosensitive member cleaning unit. In addition, toner (secondary transfer remaining toner) remaining on the intermediate transfer belt 10 after the secondary transfer and an adhering substance such as paper dust are removed and collected from the surface of the intermediate transfer belt 10 by a belt cleaning device 7 serving as an intermediate transfer member cleaning unit.

The image forming apparatus 100 is also configured to be capable of forming a single-color or a multicolor image using only one desired image forming unit S, or using some of the plurality of image forming units S.

In the first exemplary embodiment, the image forming apparatus 100 is a printer that supports a process speed (corresponding to circumferential velocity of the photosensitive drum 1 or the intermediate transfer belt 10) of 148 mm/sec and A4 size paper.

In each of the image forming units S, the photosensitive drum 1, and the charging roller 2, the development device 4, and the drum cleaning device 5 that serve as a process unit acting on the photosensitive drum 1 constitute a process cartridge 6 integrally attachable to and detachable from with respect to an apparatus main body of the image forming apparatus 100. The process cartridge 6 is made attachable and detachable with respect to the image forming apparatus 100 via a mounting unit such as a mounting guide and a positioning member that are provided on the apparatus main body of the image forming apparatus 100.

2. Transfer Configuration

In the first exemplary embodiment, the primary transfer roller 14 is a cylindrical metal roller having an outer diameter of 6 mm. In the first exemplary embodiment, steel use stainless (SUS) coated with nickel plating is used as a material of the primary transfer roller 14. In the first exemplary embodiment, the primary transfer roller 14 is arranged to be shifted from the position of the photosensitive drum 1 toward a downstream side in a moving direction of the intermediate transfer belt 10. In the first exemplary embodiment, the primary transfer roller 14 is arranged at a position at which the rotational center of the primary transfer roller 14 is shifted by 8 mm from the rotational center of the photosensitive drum 1 toward the downstream side in the moving direction of the intermediate transfer belt 10 in a cross section substantially orthogonal to a rotational axis direction of the photosensitive drum 1. In the first exemplary embodiment, to prevent a contact region of the photosensitive drum 1 and the intermediate transfer belt 10 and a contact region of the primary transfer roller 14 and the intermediate transfer belt 10 from overlapping in the moving direction of the intermediate transfer belt 10, the latter contact region is arranged on the downstream side of the former contact region. Then, the intermediate transfer belt 10 is pressed upward by the primary transfer roller 14 toward the photosensitive drum 1 to wind around the photosensitive drum 1. In the first exemplary embodiment, the primary transfer roller 14 is arranged at a position at which the intermediate transfer belt 10 is pressed upward by 1 mm toward the photosensitive drum 1 with respect to a tangent line of the photosensitive drum 1 in the cross section substantially orthogonal to the rotational axis direction of the photosensitive drum 1, and presses the intermediate transfer belt 10 with a force of about 200 gf. An amount by which the intermediate transfer belt 10 winds around the photosensitive drum 1 is thereby ensured. In the first exemplary embodiment, the primary transfer roller 14 is driven and rotated by the rotation of the intermediate transfer belt 10.

In the first exemplary embodiment, the secondary transfer roller 20 forms the secondary transfer nip N2 by being in contact with the intermediate transfer belt 10 supported by the secondary transfer opposing roller 13 from behind with a pressure force of 50 N. In the first exemplary embodiment, the secondary transfer roller 20 is a roller having an outer diameter of 18 mm and being obtained by covering the circumference of a nickel plating steel rod having an outer diameter of 8 mm with an elastic layer of an elastomeric foam (sponge) mainly containing nitrile butadiene rubber (NBR) and epichlorohydrin rubber, and having a volume resistivity of $1\times10^8$ Ω·cm and a thickness of 5 mm. In the first exemplary embodiment, the secondary transfer roller 20 is driven and rotated by the rotation of the intermediate transfer belt 10.

In the first exemplary embodiment, the intermediate transfer belt 10 is constituted of an endless belt having a circumferential length of 695 mm and a thickness of 90 μm. In the first exemplary embodiment, the intermediate transfer belt 10 is formed using polyimid resin mixed with carbon as a conducting agent. The intermediate transfer belt 10 exhibits electronically conductive characteristics as electric characteristics, and has a feature that is a small variation in resistance value with respect to temperature and humidity of atmosphere. While polyimid resin is used as a material of the intermediate transfer belt 10 in the first exemplary embodiment, the material is not limited to this. As the material of the intermediate transfer belt 10, thermoplastic resin including the following resin, for example, can be desirably used. For example, resin such as polyimide (PI), polyester, polyethylene terephthalate (PET), polybutylene terephthalate (PBT), polycarbonate, polyarylate, acrylonitrile-butadiene-styrene copolymer (ABS), polyphenylene sulfide (PPS), or polyvinylidene fluoride (PVDF), and mixed resin of these can be used. As a conducting agent, aside from carbon, conductive metallic oxide fine particles can be used.

In the first exemplary embodiment, the volume resistivity of the intermediate transfer belt 10 is $1\times10^9$ Ω·cm. The measurement of the volume resistivity was conducted using HIRESTA-UP (MCP-HT450) with a ring probe of type UR (model MCP-HTP12) manufactured by Mitsubishi Chemical Corporation. The measurement was conducted under the condition including an indoor temperature of 23° C., an indoor humidity of 50%, an applied voltage of 100 V, and a measurement time of 10 sec. The volume resistivity is a measurement unit of conductivity for the material of the intermediate transfer belt 10. The resistance in the circumferential direction of the intermediate transfer belt 10 was measured as described below.

Figure 3A:
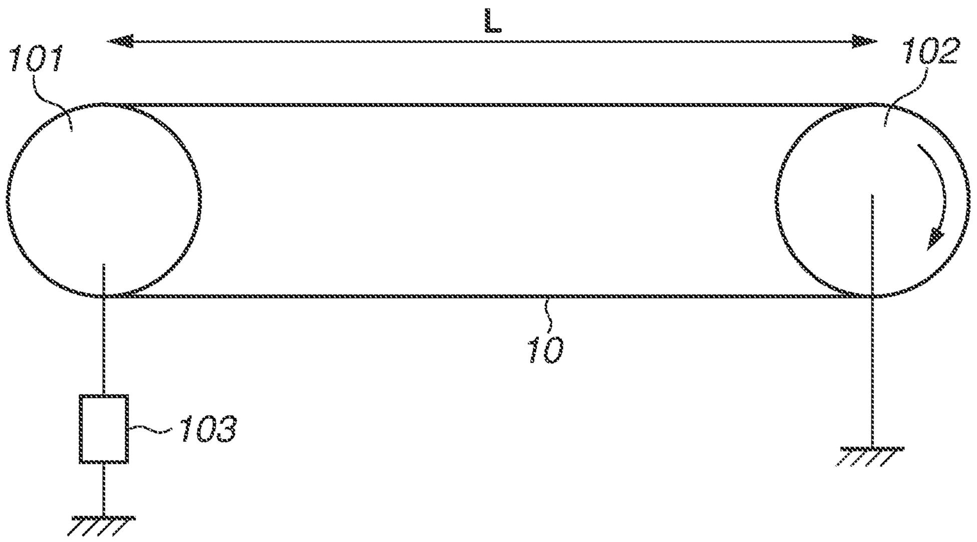
FIGS. 3A and 3B are schematic diagrams illustrating a measurement system of resistance in a circumferential direction of an intermediate transfer belt.
Figure 3B:
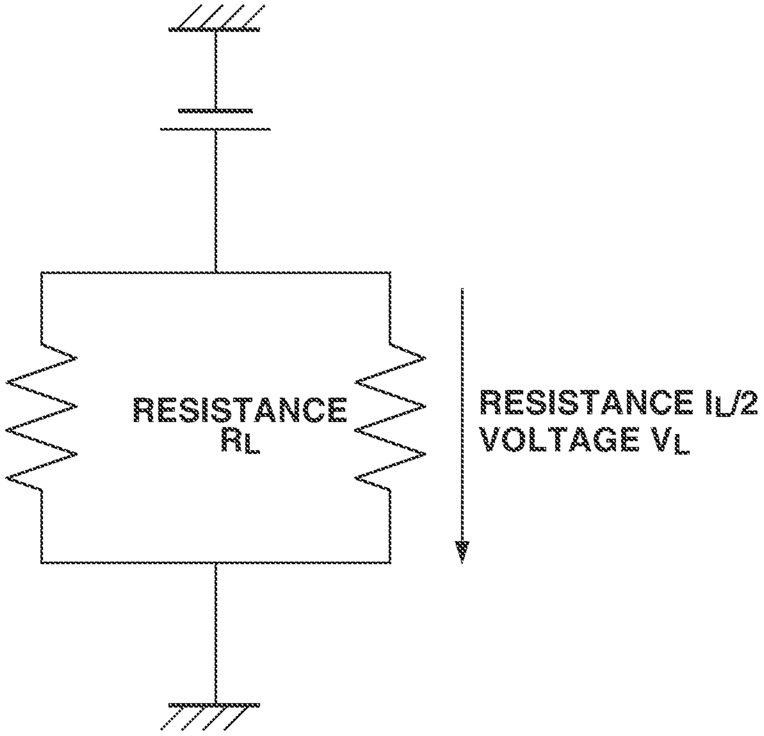

FIGS. 3A and 3B are schematic diagrams illustrating a measurement system of resistance in the circumferential direction of the intermediate transfer belt 10 (cross-sectional diagrams substantially orthogonal to the rotational axis direction of each roller to be described below). The resistance in the circumferential direction of the intermediate transfer belt 10 was measured using a measurement device (circumferential direction resistance measurement tool) illustrated in FIG. 3A. First, the configuration of the measurement device will be described. The intermediate transfer belt 10 whose resistance in the circumferential direction is to be measured is stretched around an inner surface roller 101 (outer diameter of 30 mm) and a driving roller 102 (outer diameter 30 mm) without slack. The inner surface roller 101 formed of metal is connected to a high-voltage power source (high-voltage power source manufactured by TREK, INC.: MODEL_610E) 103, and the driving roller 102 is electrically grounded (connected to the ground). The high-voltage power source (high-voltage power source manufactured by TREK, INC.: MODEL_610E) 103 can monitor an applied voltage while flowing a constant current. The driving roller 102 includes a metal core and an elastic layer formed by covering the outer circumference of the metal core with an elastic member. The surface of the driving roller 102 is covered with a conductive rubber (elastic layer) having a sufficiently-low resistance to the intermediate transfer belt 10, and the driving roller 102 rotates so that a moving speed of the intermediate transfer belt 10 becomes 100 mm/sec.

Next, a measurement method will be described. In a state in which the intermediate transfer belt 10 is rotated by the driving roller 102 at the moving speed of 100 mm/sec, a constant current $I_L$ is flowed to the inner surface roller 101 by the high-voltage power source 103, and a voltage $V_L$ between the inner surface roller 101 and the ground is monitored by the high-voltage power source 103. The measurement system illustrated in FIG. 3A can be regarded as an equivalent circuit illustrated in FIG. 3B. More specifically, a resistance $R_L$ in the circumferential direction of the intermediate transfer belt 10 in a distance (rotational center-to-center distance) L between the inner surface roller 101 and the driving roller 102 can be calculated by $R_L=2V_L/I_L$. In the first exemplary embodiment, the distance L between the inner surface roller 101 and the driving roller 102 is 300 mm. By converting the above-described resistance $R_L$ into a value corresponding to a length of 100 mm in the circumferential direction of the intermediate transfer belt 10, a resistance in the circumferential direction of the intermediate transfer belt 10 is obtained. To flow a current to the photosensitive drum 1 from a current supply member through the intermediate transfer belt 10, the resistance in the circumferential direction of the intermediate transfer belt 10 is desirably $1\times10^9$ Ω or less.

In the first exemplary embodiment, a resistance value in the circumferential direction of the intermediate transfer belt 10 that has been obtained by the above-described measurement method is $1\times10^8$ Ω. In the first exemplary embodiment, a voltage $V_L$ monitored by the above-described measurement method was 750 V in a case where a constant current $I_L$=5 μA was flowed. The monitoring of the voltage $V_L$ was performed for a section corresponding to one round of the intermediate transfer belt 10, and an average value of measurement values for the section was defined as the voltage $V_L$. Since the resistance $R_L$ can be calculated by $R_L=2V_L/I_L$, $R_L=2\times750/(5\times10^{-6})=3\times10^{8}\Omega$ is obtained, and by converting the resistance into a value corresponding to the length of 100 mm in the circumferential direction of the intermediate transfer belt 10, a resistance value in the circumferential direction of the intermediate transfer belt 10 becomes $1\times10^{8}\Omega$. In a case where a maximum distance from the current supply member to the photosensitive drum 1 is 100 mm or more, it is sufficient that a resistance is converted into a resistance in the circumferential direction that corresponds to the length. In the first exemplary embodiment, a conductive belt having conductivity that enables a current flow in the circumferential direction in this manner is used as the intermediate transfer belt 10. As described below, in the first exemplary embodiment, the intermediate transfer belt 10 has conductivity that enables a current flow in the circumferential direction of the intermediate transfer belt 10 at least between the secondary transfer nip N2 and the primary transfer nip N1. The resistance value in the circumferential direction of the intermediate transfer belt 10 is not limited to this, but the resistance value is typically about $1\times10^{4}\Omega$ or more.

The intermediate transfer belt 10 may have a single-layer configuration or a multilayer configuration including a plurality of layers. The intermediate transfer belt 10 having the multilayer configuration may have the following configuration, for example. The intermediate transfer belt 10 includes, for example, a base layer obtained by dispersing carbon in a PPS resin having a thickness of about 100 μm and adjusting an electric resistance. Resin to be used may be PI, PVDF, nylon, PET, PBT, polycarbonate, polyether ether ketone (PEEK), or polyethylene naphthalate (PEN). In addition, a surface layer being formed of high-resistance acrylic resin and having a thickness of about 0.5 to 3 μm is provided on the outer surface of the base layer. The high-resistance layer being the surface layer is provided, for example, to improve secondary transferability for a small-sized recording material P by reducing a current difference between a region where the recording material P passes and a region where the recording material P does not pass in a longer direction of the secondary transfer nip N2 (rotational axis direction of the secondary transfer roller 20). As conductive powder contained in the base layer, carbon black can be used. Nevertheless, an additive agent to be mixed to adjust the electric resistance value of the intermediate transfer belt 10 is not specifically limited. Examples of conductive filler for adjusting the resistance include carbon black and various conductive metal oxides. Examples of non-filler type resistance adjuster include a low-molecular-weight ion conductive material such as various metal salts and glycols, charging prevention resin containing an ether bond or a hydroxyl group in molecules, or an organic high-molecular compound exhibiting electronic conductivity. In addition, the intermediate transfer belt 10 having the multilayer configuration may have the following configuration, for example. The intermediate transfer belt 10 includes a base layer and an inner surface layer. As the base layer, endless PVDF in which ion conducting agent such as multivalent metal salt or quaternary ammonium ion serving as the conducting agent is mixed in is used. As the inner surface layer, an acrylic resin in which carbon serving as the conducting agent is mixed in is used. In this case, the base layer is the thickest layer among layers included in the intermediate transfer belt 10, in a thickness direction of the intermediate transfer belt 10. The inner surface layer is a layer formed on the inner circumferential surface side of the intermediate transfer belt 10. In the thickness direction being a direction intersecting with the moving direction of the intermediate transfer belt 10, the base layer is formed at a position closer to the photosensitive drums 1 than the inner surface layer. As a material of the base layer, PVDF can be used, but another material may be used. For example, a material such as polyester or ABS, and a mixed resin of these may be used. As a material of the inner surface layer, an acrylic resin can be used, but another material may be used. For example, a material such as polyester may be used. Electric resistances of the base layer and the inner surface layer may be different, and the electric resistance of the inner surface layer can be set to a lower electric resistance than the electric resistance of the base layer. A surface resistivity measured from the outer circumferential surface side (base layer side) can be regarded as an electric resistance of the base layer, and a surface resistivity measured from the inner circumferential surface side (inner surface layer side) can be regarded as an electric resistance of the inner surface layer.

3. Transfer Potential Formation

In the first exemplary embodiment, on the inner circumferential surface side of the intermediate transfer belt 10, the primary transfer rollers **14*a*, 14*b*, 14*c*, and 14*d* are arranged to correspond to the respective photosensitive drums 1*a*, 1*b*, 1*c*, and 1*d*. In the first exemplary embodiment, the primary transfer rollers 14*a*, 14*b*, 14*c*, and 14*d* are connected to respective primary transfer power sources (one or more high-voltage power source circuits) 15*a*, 15*b*, 15*c*, and 15*d*. In the first exemplary embodiment, the driving roller 11, the tension roller 12, and the secondary transfer opposing roller 13 are electrically floating. At the time of image formation (at the time of primary transfer, at the time of secondary transfer), a primary transfer voltage (+100 V in the first exemplary embodiment) with opposite polarity to the normal charging polarity of toner is applied to the primary transfer rollers 14 from the respective primary transfer power sources 15 by constant voltage control. Primary transfer potential (potential difference between the photosensitive drum 1 and the intermediate transfer belt 10) is thereby formed at each of the primary transfer nips N1. Due to the potential difference, the current (primary transfer current) flows from the intermediate transfer belt 10 to each of the photosensitive drums 1. By the function of the primary transfer current, primary transfer is performed so that toner images move from the surfaces of the respective photosensitive drums 1 onto the intermediate transfer belt 10. In the first exemplary embodiment, the primary transfer roller 14 forms the current supply member that comes into contact with the intermediate transfer belt 10 at a position different from that of the photosensitive drum 1, flows a current in the circumferential direction of the intermediate transfer belt 10 by receiving a voltage, and primarily transfers a toner image from the photosensitive drum 1 onto the intermediate transfer belt 10. In other words, in the first exemplary embodiment, at the time of image formation (at the time of primary transfer, at the time of secondary transfer), the potentials of the primary transfer rollers 14 are maintained at the predetermined potential (+100 V in the first exemplary embodiment), and the primary transfer potentials at the primary transfer nips N1 are maintained at the predetermined potential. The predetermined potential of the primary transfer rollers 14 maintained by the primary transfer power sources 15 is set so that a primary transfer potential that enables desired transfer efficiency to be obtained can be maintained at the primary transfer nips N1. By using the intermediate transfer belt 10 having conductivity that enables a current flow in the circumferential direction, an effect of stabilizing the surface potential (primary transfer potential) of the intermediate transfer belt 10 by flowing a primary transfer current in the circumferential direction of the intermediate transfer belt 10 can be obtained. With this configuration, primary transferability at the plurality of primary transfer nips N1** can be improved.

A secondary transfer power source (high-voltage power source circuit) 21 is connected to the secondary transfer roller 20. At the time of image formation (at the time of primary transfer, at the time of secondary transfer), a predetermined secondary transfer voltage, to be described below in detail, is applied to the secondary transfer roller 20 from the secondary transfer power source 21 by constant voltage control. If the voltage is applied from the secondary transfer power source 21 to the secondary transfer roller 20, the secondary transfer potential (potential difference between the intermediate transfer belt 10 and the secondary transfer roller 20) is formed at the secondary transfer nip N2. Due to the potential difference, the current (secondary transfer current) flows from the secondary transfer roller 20 to the intermediate transfer belt 10. By the function of the secondary transfer current, secondary transfer is performed so that a toner image moves from the surface of the intermediate transfer belt 10 onto the recording material P.

4. Control Configuration

Figure 2:
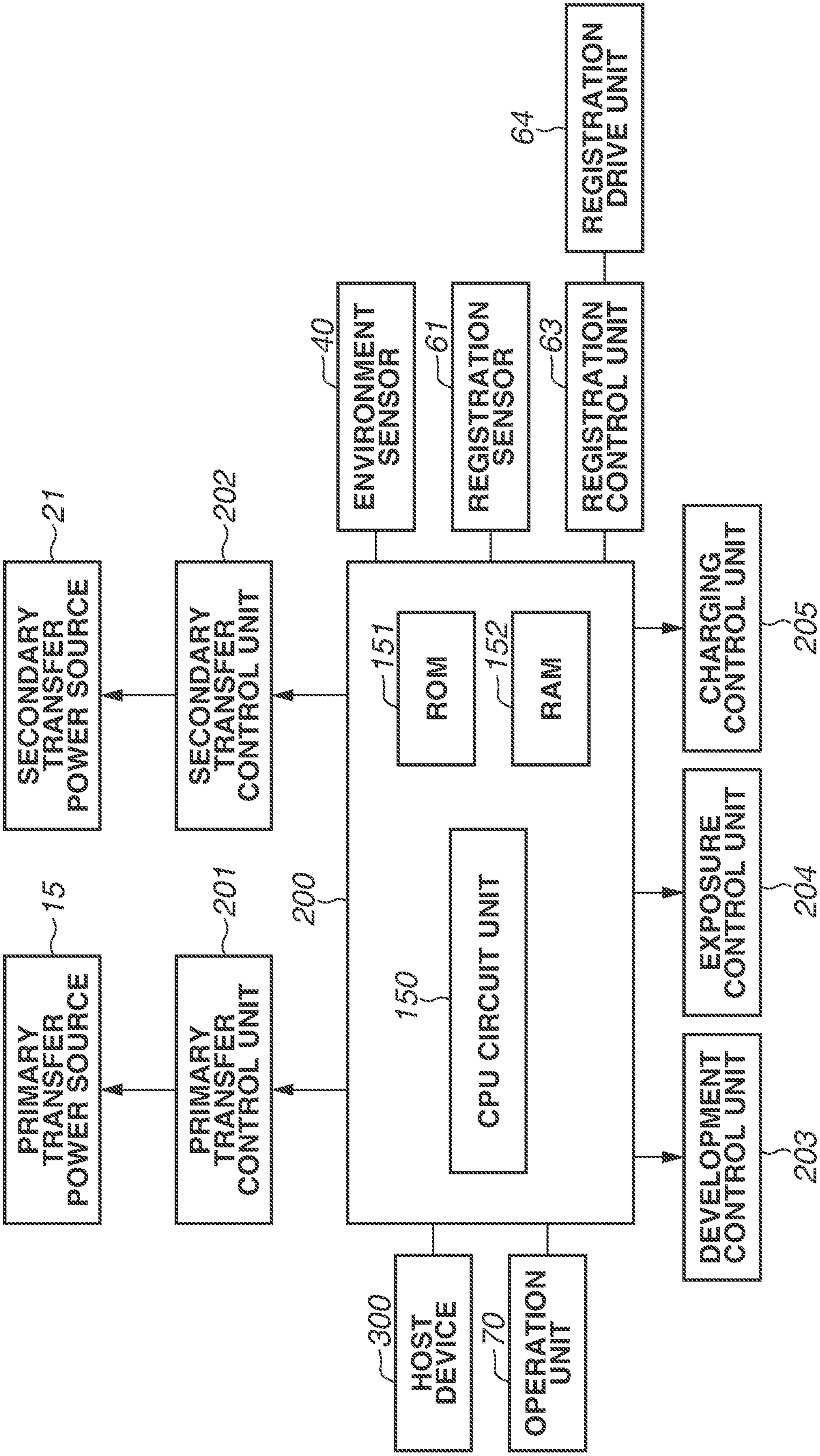
FIG. 2 is a block diagram schematically illustrating a control configuration of a main part of the image forming apparatus.

FIG. 2 is a block diagram schematically illustrating a control configuration of a main part of the image forming apparatus 100 according to the first exemplary embodiment. The image forming apparatus 100 includes a controller 200 serving as a control unit that controls the entire image forming apparatus 100. The controller 200 incorporates a CPU circuit unit 150 being a calculation control unit, and a read-only memory (ROM) 151 and a random access memory (RAM) 152 being storage units. In accordance with control programs stored in the ROM 151, the CPU circuit unit 150 comprehensively controls components of the image forming apparatus 100 such as a primary transfer control unit 201, a secondary transfer control unit 202, a development control unit 203, an exposure control unit 204, and a charging control unit 205. A table for determining a target value of the secondary transfer voltage to be described below is stored in the ROM 151. The table is read by the CPU circuit unit 150 and reflected in the control. The RAM 152 temporarily stores control data and is used as a work area of calculation processing associated with the control.

Under the control of the controller 200, the primary transfer control unit 201 and the secondary transfer control unit 202 respectively control the primary transfer power source 15 and the secondary transfer power source 21. The primary transfer control unit 201 and the secondary transfer control unit 202 respectively include current detection units (one or more current detection circuits) (not illustrated) and can respectively control voltages to be output from the primary transfer power source 15 and the secondary transfer power source 21, based on current values detected by the current detection units. In addition, the primary transfer control unit 201 and the secondary transfer control unit 202 respectively include voltage detection units (one or more voltage detection circuits) (not illustrated) and can respectively control voltages to be output from the primary transfer power source 15 and the secondary transfer power source 21, based on voltage values detected by the voltage detection units. In the first exemplary embodiment, a voltage to be output from the primary transfer power source 15 at the time of image formation (at the time of primary transfer, at the time of secondary transfer) is subjected to constant voltage control. In the first exemplary embodiment, a voltage to be output from the secondary transfer power source 21 at the time of image formation (at the time of primary transfer, at the time of secondary transfer) is subjected to constant voltage control. The control of the secondary transfer voltage will be described below in more detail.

An operation unit (operation panel) 70 provided in the image forming apparatus 100 is connected to the controller 200. The operation unit 70 includes a display unit that displays information under the control of the controller 200, and an input unit that inputs information to the controller 200 by an operation performed by an operator such as a user or a service person in charge. The operation unit 70 may include a touch panel having functions of the display unit and the input unit. A host device (external device) 300 such as a personal computer that is connected to the image forming apparatus 100 is connected to the controller 200. An image reading device (not illustrated) provided in the image forming apparatus 100 or connected to the image forming apparatus 100 may be connected to the controller 200. In addition, various sensors provided in the image forming apparatus 100, such as a registration sensor 61 and an environment sensor 40 to be described below, are connected to the controller 200. Signals related to detection results of the sensors such as the registration sensor 61 and the environment sensor 40 are input to the controller 200 and used in the control performed by the CPU circuit unit 150. In addition, a registration control unit 63 to be described below is connected to the controller 200. The registration control unit 63 controls a registration driving unit 64 to be described below under the control of the controller 200.

If the controller 200 receives image information and printing information (printing command) from the host device 300 such as a personal computer, the controller 200 performs control to execute a printing operation (job) by controlling the above-described control units. The printing information includes a start instruction (start signal) of the printing operation, and information regarding an image forming condition such as information regarding the recording material P. The information regarding the recording material P includes any type of information that can distinguish the recording material P, such as an attribute (i.e., paper type category) that is based on general characteristics such as plain paper, fine quality paper, glossy paper, gloss paper, coated paper, embossed paper, thick paper, thin paper, and paper quality, numerical values or numerical value ranges of grammage, thickness, size, and rigidity, or brand (including a manufacturer, product name, part number, etc.). The type of recording material P can be determined for each recording material P distinguished by the information regarding the recording material P. The information regarding the recording material P may be included in information regarding an image formation mode that designates an operation setting of the image forming apparatus 100, such as a “plain paper mode” and a “gloss paper mode”, or may be replaced with the information regarding an image formation mode. The printing information may be input to the controller 200 from the operation unit 70. The image information may be input to the controller 200 from the operation unit 70 or the image reading device (not illustrated).

5. Control of Secondary Transfer Voltage

Figure 4A:
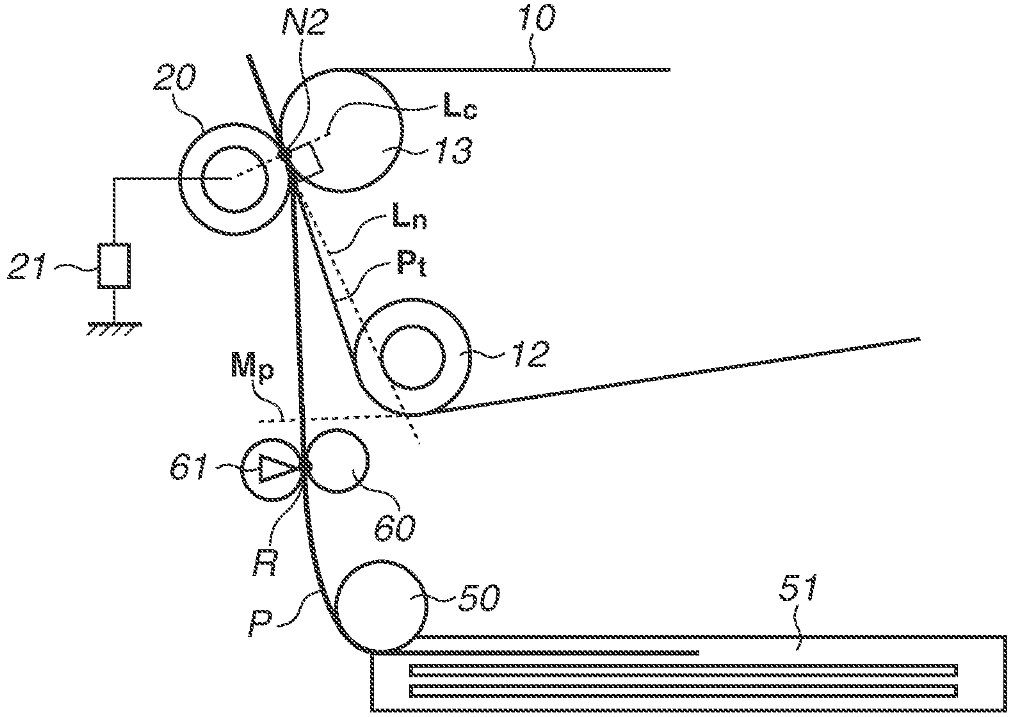
FIGS. 4A and 4B are schematic cross-sectional diagrams illustrating the vicinity of a secondary transfer portion according to a first exemplary embodiment.
Figure 4B:
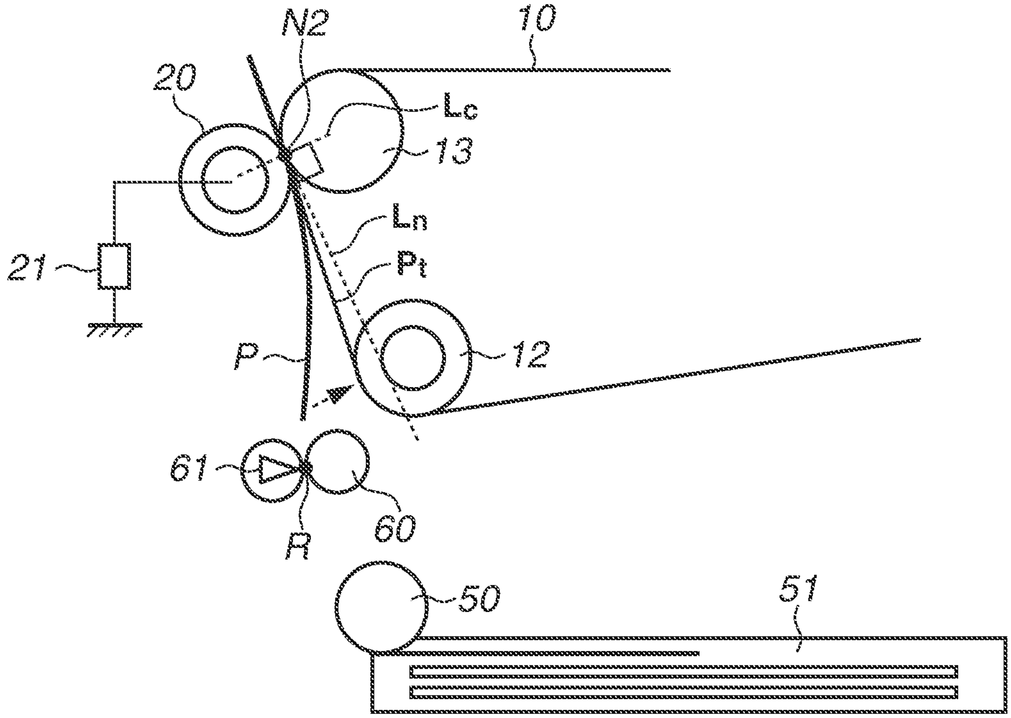

Next, the control of the secondary transfer voltage according to the first exemplary embodiment will be further described. FIGS. 4A and 4B are cross-sectional diagrams illustrating a conveyance orientation of the recording material P in the vicinity on an upstream side of the secondary transfer nip N2 according to the first exemplary embodiment (cross section substantially orthogonal to the rotational axis direction of the secondary transfer roller 20 and the secondary transfer opposing roller 13). FIG. 4A illustrates the conveyance orientation of the recording material P before the trailing end of the recording material P passes through a registration roller nip R to be described below, and FIG. 4B illustrates the conveyance orientation of the recording material P after the trailing end of the recording material P passes through the registration roller nip R to be described below.

In the first exemplary embodiment, the registration roller pair 60 also serves as a regulation member that regulates the orientation of the recording material P. The regulation member is arranged on the upstream side of the secondary transfer nip N2, and regulates the orientation of the recording material P being in contact with the secondary transfer roller 20 and the regulation member. If the trailing end of the recording material P passes through a contact portion with the registration roller pair 60, i.e., passes through the registration roller nip R formed by two rollers of the registration roller pair 60, the orientation of a portion on the trailing end side of the recording material P in the vicinity on the upstream side of the secondary transfer nip N2 becomes free. The portion on the trailing end side of the recording material P is a portion of the recording material P, which is passing through the secondary transfer nip (secondary transfer portion) N2, that is located between the secondary transfer roller (outer roller) 20 and the registration roller pair (regulation member) 60.

The first exemplary embodiment is characterized in that a target voltage of a secondary transfer voltage is increased at a timing at which the portion on the trailing end side of the recording material P moves closer to the intermediate transfer belt 10 to be along the surface of the intermediate transfer belt 10 by a change in orientation of the portion on the trailing end side of the recording material P. A state in which the portion on the trailing end side of the recording material P is along the surface of the intermediate transfer belt 10 typically refers to a state in which the portion on the trailing end side of the recording material P becomes substantially parallel to the surface (pre-secondary transfer nip stretching surface Pt to be described below) of the intermediate transfer belt 10. In a state in which the portion on the trailing end side of the recording material P is along the surface of the intermediate transfer belt 10, typically, at least part of the portion on the trailing end side of the recording material P comes into contact with the surface of the intermediate transfer belt 10, but the entire portion on the trailing end side of the recording material P may have no contact with the intermediate transfer belt 10. Hereinafter, more detailed description will be given.

In the first exemplary embodiment, the secondary transfer roller 20 forms the secondary transfer nip N2 by being in contact with the outer circumferential surface of the intermediate transfer belt 10 with a pressure force of 50 N. The secondary transfer roller 20 is driven and rotated by the rotation of the intermediate transfer belt 10. Then, the recording material P such as paper is conveyed while being pinched between the intermediate transfer belt 10 and the secondary transfer roller 20 at the secondary transfer nip N2.

The secondary transfer power source 21 is connected to the secondary transfer roller 20 and supplies a secondary transfer voltage, which is output from a transformer, to the secondary transfer roller 20. As illustrated in FIG. 2, the secondary transfer control unit 202 is controlled by the CPU circuit unit 150 of the controller 200, which is a control integrated circuit (IC) of the image forming apparatus 100. The secondary transfer voltage to be output by the secondary transfer power source 21 is controlled by the secondary transfer control unit 202. In the first exemplary embodiment, the secondary transfer control unit 202 feeds back a difference between a preset target voltage and a detected voltage being an actual output value of the secondary transfer power source 21 that is detected by the voltage detection unit, to the transformer of the secondary transfer power source 21 so that the secondary transfer voltage becomes substantially constant. The secondary transfer control unit 202 thereby performs constant voltage control of the secondary transfer voltage to be supplied to the secondary transfer roller 20 from the secondary transfer power source 21. The control of adjusting an output from a power source so that a value of a voltage output by the power source becomes closer to a target voltage value, irrespective of a value of a flowing current, is referred to as the constant voltage control. In the first exemplary embodiment, the constant voltage control of a primary transfer voltage to be applied to the primary transfer roller 14 from the primary transfer power source 15 is performed similarly to the above-described control by the CPU circuit unit 150 of the controller 200 and the primary transfer control unit 201.

In the first exemplary embodiment, the resistance in the circumferential direction of the intermediate transfer belt 10 is so low that a current can flow in the circumferential direction of the intermediate transfer belt 10. In the first exemplary embodiment, the intermediate transfer belt 10 has conductivity that enables a current flow in the circumferential direction of the intermediate transfer belt 10 at least between the secondary transfer nip N2 and the primary transfer nip N1. Thus, the potential of the secondary transfer opposing roller 13 arranged at a position facing the secondary transfer roller 20 is set to a potential substantially the same as the potential (primary transfer voltage) of the primary transfer roller 14. More specifically, the potential is set to +100 V in the first exemplary embodiment as described above. Then, in the first exemplary embodiment, at the secondary transfer nip N2, the secondary transfer is performed by the secondary transfer current being flowed to a toner image due to the potential difference between the secondary transfer voltage determined by the secondary transfer control unit 202 and the potential of the secondary transfer opposing roller 13. In the first exemplary embodiment, the secondary transfer power source 21 can output a voltage within the range of +100 V to +4000 V.

As described above, the feeding roller 50 serving as a feeding unit picks up the recording materials P in the cassette 51 serving as a recording material storage portion, one by one, and feeds the recording materials P to the registration roller pair 60 serving as a conveyance unit. The registration roller pair 60 includes two rollers arranged to face each other. The two rollers form the registration roller nip R in the contact portion by at least one of the two rollers being pressed against the other. At least one of the two rollers is driven and rotated by the registration driving unit 64 (FIG. 2) including a driving source and a chain of drives. In the first exemplary embodiment, the two rollers of the registration roller pair 60 are individually driven and rotated by the registration driving unit 64, but in the case of a configuration in which one of the rollers is driven and rotated by the registration driving unit 64, the other one roller is driven and rotated by the rotation of the one roller. A start and a stop of rotation of the registration roller pair 60 that is driven by the registration driving unit 64 and a rotation speed thereof are controlled by the registration control unit 63 (FIG. 2) under the control of the controller 200.

The conveyance of the recording material P from when the leading end of the recording material P enters the secondary transfer nip N2 to when the trailing end of the recording material P passes through the registration roller nip R will be described with reference to FIG. 4A. The registration roller pair 60 conveys the recording material P, which has been fed by the feeding roller 50, to the secondary transfer nip N2 while nipping the recording material P at the registration roller nip R. At this time, as illustrated in FIG. 4A, the orientation of the recording material P is regulated by the secondary transfer nip N2 and the registration roller nip R, and substantially constant secondary transferability is maintained.

In the first exemplary embodiment, the registration sensor 61 that detects the presence or absence of the recording material P on a conveyance path of the recording material P is provided at the position of the registration roller pair 60. In the first exemplary embodiment, the leading end of the recording material P is detected by the registration sensor 61. Then, the controller 200 can predict the position of the trailing end of the recording material P by acquiring a signal output by the registration sensor 61 when the registration sensor 61 detects the leading end of the recording material P. Specifically, in the first exemplary embodiment, the controller 200 predicts the position of the trailing end of the recording material P based on a detection signal of the registration sensor 61, information regarding a size of the recording material P, and information regarding a conveyance speed of the recording material P. The controller 200 can acquire the information regarding a size of the recording material P (in particular, information regarding a length in the conveyance direction of the recording material P) from the information regarding the recording material P that is included in the printing information input from the host device 300, for example. The controller 200 can also acquire the information regarding a conveyance speed of the recording material P from a control value of the registration driving unit 64 that is designated by the registration control unit 63, for example. The controller 200 can thereby control the secondary transfer voltage based on the position of the trailing end of the recording material P as described below in more detail.

In the first exemplary embodiment, the conveyance speed of the recording material P conveyed by the registration roller pair 60 is changed depending on a timing at which the leading end of the recording material P is detected, so that the leading end of the recording material P and a leading end of a page range on the intermediate transfer belt 10 match each other at a predetermined position anterior to the secondary transfer nip N2. Hereinafter, the above-described predetermined position anterior to the secondary transfer nip N2 will be referred to as a merge point MP. Then, before the leading end of the recording material P reaches the merge point MP, the conveyance speed of the recording material P conveyed by the registration roller pair 60 is returned to the speed before the change, and the recording material P is conveyed to the secondary transfer nip N2. With this configuration, at the secondary transfer nip N2, the positions of the leading end of the recording material P and the leading end of the page range on the intermediate transfer belt 10 can be matched without stopping the conveyance of the recording material P. The page range on the intermediate transfer belt 10 is a range on the intermediate transfer belt 10 that corresponds to the size of the recording material P, and a toner image is formed within the range. Then, at the secondary transfer nip N2, the toner image formed within the page range on the intermediate transfer belt 10 is transferred onto the recording material P.

Next, the conveyance of the recording material P from when the trailing end of the recording material P passes through the registration roller nip R to when the trailing end of the recording material P passes through the secondary transfer nip N2 will be described with reference to FIG. 4B. The orientation of the recording material P during the period is different from the orientation of the recording material P illustrated in FIG. 4A. Specifically, if the trailing end of the recording material P passes through the registration roller nip R, the orientation of the portion on the trailing end side of the recording material P on the upstream side of the secondary transfer nip N2 becomes the orientation as illustrated in FIG. 4B. In other words, the orientation of the portion on the trailing end side of the recording material P changes from the orientation when the recording material P is pinched by the secondary transfer nip N2 and the registration roller nip R, and becomes a free state.

In a cross section substantially orthogonal to the rotational axis direction of the secondary transfer roller 20 and the secondary transfer opposing roller 13, a straight line connecting the rotational center of the secondary transfer opposing roller 13 and the rotational center of the secondary transfer roller 20 is defined as a secondary transfer nip center line Lc. In the cross section, a straight line orthogonal to the secondary transfer nip center line Lc and passing through a contact point of the intermediate transfer belt 10 on the secondary transfer nip center line Lc and the secondary transfer roller 20 is defined as a secondary transfer nip tangent line Ln. In addition, a stretching surface (outer circumferential surface) of the intermediate transfer belt 10 formed by the tension roller 12 and the secondary transfer opposing roller 13 is defined as the pre-secondary transfer nip stretching surface Pt. The tension roller 12 is an example of a stretching roller arranged next to the secondary transfer opposing roller 13 on the upstream side of the secondary transfer opposing roller 13 in the moving direction of the intermediate transfer belt 10. At this time, in the first exemplary embodiment, the secondary transfer nip tangent line Ln is located on a secondary transfer opposing roller 13 (inner roller) side of the pre-secondary transfer nip stretching surface Pt. When the recording material P is pinched at the secondary transfer nip N2, the recording material P tends to take the orientation of being along the secondary transfer nip tangent line Ln. Thus, in the case of a configuration in which the pre-secondary transfer nip stretching surface Pt is on the secondary transfer opposing roller 13 side of the secondary transfer nip tangent line Ln as in the first exemplary embodiment, the recording material P changes as follows. More specifically, the portion on the trailing end side of the recording material P that has passed through the registration roller nip R moves closer to the intermediate transfer belt 10 due to the rigidity (stiffness) of the recording material P and changes into a shape of being along the pre-secondary transfer nip stretching surface Pt.

In the case of decreasing the resistance of the intermediate transfer belt 10 to flow the primary transfer current in the circumferential direction of the intermediate transfer belt 10 as in the first exemplary embodiment, the following issue arises. More specifically, if the recording material P is along the intermediate transfer belt 10 as described above, the secondary transfer nip N2 apparently widens, and a large amount of current flows to the intermediate transfer belt 10 via the recording material P. Consequently, the load on the secondary transfer power source 21 increases, and the secondary transfer voltage drops, and thus a secondary transfer defect may occur because the secondary transfer voltage necessary for a secondary transfer process is not secured at the secondary transfer nip N2.

Addressing the issue by the improvement in performance of the secondary transfer power source 21 may lead to upsizing and a cost increase of the image forming apparatus 100. Thus, in the configuration in which the intermediate transfer belt 10 having conductivity that enables a current flow in the circumferential direction is used, it is desirable to prevent an occurrence of a secondary transfer defect attributed to the change in the orientation of the portion on the trailing end side of the recording material P in the vicinity on the upstream side of the secondary transfer nip N2 with a simple configuration without involving the upsizing and the cost increase of the image forming apparatus 100.

In view of the foregoing, in the first exemplary embodiment, the target voltage of the secondary transfer voltage is increased at a timing at which the trailing end of the recording material P passes through the registration roller nip R and the portion on the trailing end side of the recording material P is along the pre-secondary transfer nip stretching surface Pt.

Figure 5:
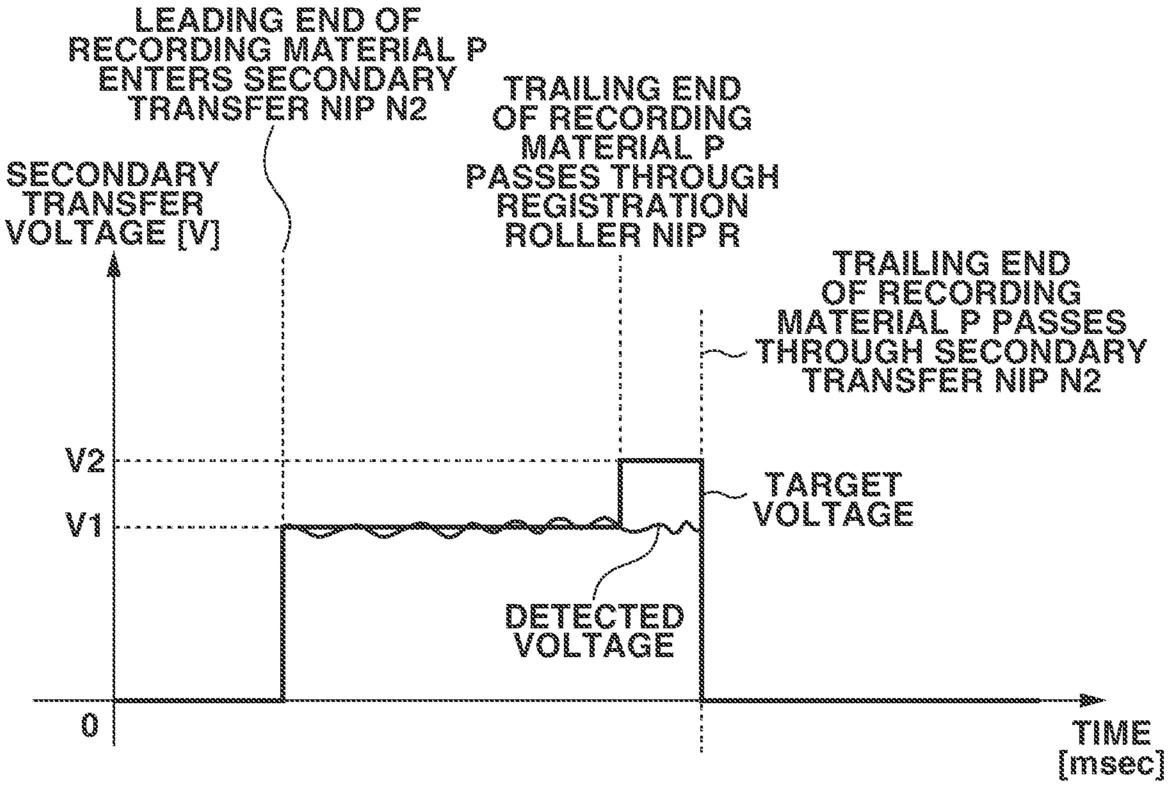
FIG. 5 is a chart illustrating control of a secondary transfer voltage according to the first exemplary embodiment.

FIG. 5 is a chart illustrating control of the secondary transfer voltage according to the first exemplary embodiment. FIG. 5 illustrates transitions of the target voltage in the control of the secondary transfer voltage that is performed by the secondary transfer control unit 202 and the detected voltage being an actual output value of the secondary transfer power source 21 that is detected by the voltage detection unit, from when the recording material P enters the secondary transfer nip N2 to when the secondary transfer process ends.

In the first exemplary embodiment, based on the information regarding a size of the recording material P in the information regarding the recording material P that is included in the printing information input from the host device 300, the controller 200 predicts a timing at which the trailing end of the recording material P passes through the registration roller nip R. In other words, the controller 200 predicts a timing at which the trailing end of the recording material P becomes free. After that, during a period from when the leading end of the recording material P enters the secondary transfer nip N2 to when the trailing end of the recording material P passes through the registration roller nip R, the controller 200 controls the secondary transfer control unit 202 to apply the secondary transfer voltage to the secondary transfer roller 20 from the secondary transfer power source 21 by setting the target voltage of the secondary transfer voltage to a first target voltage (first target value) V1. Then, the controller 200 controls the secondary transfer control unit 202 to increase the target voltage of the secondary transfer voltage to a second target voltage (second target value) V2 at a timing at which the trailing end of the recording material P passes through the registration roller nip R. With this configuration, an effect of preventing a drop in secondary transfer voltage that is attributed to an increase in load on the secondary transfer power source 21 at a timing at which the trailing end of the recording material P passes through the registration roller nip R is obtained.

Next, setting of the first and second target voltages V1 and V2 will be described. In the first exemplary embodiment, the controller 200 selects the first and second target voltages V1 and V2 based on the information regarding the recording material P that is included in the printing information input from the host device 300, and information regarding an environment. In other words, depending on the type of recording material P, (1) rigidity (stiffness) of the recording material P and (2) a resistance value of the recording material P vary. The rigidity of the recording material P varies depending on the size, grammage, paper quality, paper type category, and a brand of the recording material P, for example. In the first exemplary embodiment, as information regarding the rigidity of the recording material P, the grammage or the paper type category (or the brand) is used. The resistance of the recording material P varies depending on the grammage, the paper quality, the paper type category, or the brand of the recording material P, for example. In the first exemplary embodiment, as information regarding a resistance value of the recording material P, the grammage or the paper type category (or the brand) is used. When the paper quality, the paper type category, or the brand of the recording material P is the same (or can be regarded as equivalent), because the grammage and the thickness of the recording material P (paper) tend to be in a substantially proportional relation, the grammage may be used as an index of the thickness, or the thickness may be used in place of the grammage. The resistance value of the recording material P also varies depending on the environment. The information regarding an environment may be information regarding at least one of temperature or humidity on at least one of the inside or outside of the image forming apparatus 100. In the first exemplary embodiment, as the information regarding an environment, information regarding an absolute moisture amount that is obtained based on a detection result of the temperature and humidity of ambient atmosphere around the image forming apparatus 100 by the environment sensor 40 provided in the image forming apparatus 100 is used. The absolute moisture amount may be obtained by the environment sensor 40, or may be obtained by the controller 200 based on the detection result of the environment sensor 40. With respect to the above-described (1) rigidity of the recording material P and (2) the resistance value of the recording material P, the following tendency can be generally observed although not limited thereto.

As for (1) rigidity of the recording material P, as the rigidity becomes higher (the recording material P becomes thicker and stiffness becomes stronger), a spring constant of the recording material P becomes larger. Thus, as the rigidity becomes higher, after the trailing end of the recording material P passes through the registration roller nip R, the orientation of the portion on the trailing end side of the recording material P swiftly changes, the portion on the trailing end side of the recording material P moves to be along the intermediate transfer belt 10 more quickly, and a contact area tends to be larger. In other words, a drop amount of the secondary transfer voltage at a timing at which the trailing end of the recording material P passes through the registration roller nip R varies depending on the rigidity of the recording material P. Thus, it is desirable to change the second target voltage V2 (a change amount of the second target voltage V2 with respect to the first target voltage V1) depending on the rigidity of the recording material P. Since the rigidity of the recording material P varies depending on the type of recording material P, it is desirable to change the second target voltage V2 (the change amount of the second target voltage V2 with respect to the first target voltage V1) depending on the type of recording material P (the grammage or paper type category (or brand) in the first exemplary embodiment).

As for (2) the resistance value of the recording material P, a secondary transfer voltage for flowing the necessary secondary transfer current at the secondary transfer nip N2 varies depending on the resistance value of the recording material P. Thus, it is desirable to change the first target voltage V1 depending on the resistance value of the recording material P. In addition, even after the trailing end of the recording material P passes through the registration roller nip R and the portion on the trailing end side of the recording material P moves to be along the intermediate transfer belt 10, a drop amount of the secondary transfer voltage varies depending on the resistance of the recording material P. Thus, it is desirable to change the second target voltage V2 (the change amount of the second target voltage V2 with respect to the first target voltage V1) depending on the resistance value of the recording material P, to sufficiently prevent the drop in secondary transfer voltage. The resistance value of the recording material P varies depending on the type of recording material P. Thus, it is desirable to change the first target voltage V1 and the second target voltage V2 (the change amount of the second target voltage V2 with respect to the first target voltage V1) depending on the type of recording material P (the grammage or paper type category (or brand) in the first exemplary embodiment). In addition, an environment (the absolute moisture amount in the first exemplary embodiment) affects the resistance value of the recording material P (as an absolute moisture amount becomes larger, the resistance becomes lower). Thus, it is desirable to change the first target voltage V1 and the second target voltage V2 (the change amount of the second target voltage V2 with respect to the first target voltage V1) depending on an absolute moisture amount for each type of recording material P.

The change amount of the second target voltage V2 with respect to the first target voltage V1 is affected by moisture absorbability of each type of recording material P. Thus, a dominantly affecting property changes between the rigidity and the resistance value. Thus, it is desirable to appropriately preset the change amount of the second target voltage V2 with respect to the first target voltage V1 through experiments so that a secondary transfer defect can be sufficiently prevented. Generally, in the case of the recording material P having a surface on which coating processing is not performed, such as plain paper, a property of increased absorbability as the grammage is small tends to dominantly exert influence compared to an increase in rigidity caused by an increase in grammage. Thus, for the recording material P of this type, the difference between the first target voltage V1 and the second target voltage V2 for the recording material P having a first grammage is made larger than the difference between the first target voltage V1 and the second target voltage V2 for the recording material P having a second grammage larger than the first grammage (higher rigidity). Then, the difference between the first target voltage V1 and the second target voltage V2 when the absolute moisture amount is a first absolute moisture amount is made larger than the difference between the first target voltage V1 and the second target voltage V2 when the absolute moisture amount is a second absolute moisture amount larger than the first absolute moisture amount (resistance of the recording material P is lower) (refer to Table 1 provided below). On the other hand, in the case of the recording material P having a surface on which coating processing is performed, such as gloss paper, the increase in rigidity caused by an increase in grammage tends to dominantly exert influence compared to the property of increased absorbability as the grammage is small. Thus, for the recording material P of this type, the difference between the first target voltage V1 and the second target voltage V2 for the recording material P having the second grammage larger than the first grammage (higher rigidity) is made larger than the difference between the first target voltage V1 and the second target voltage V2 for the recording material P having the first grammage. Then, the difference between the first target voltage V1 and the second target voltage V2 when the absolute moisture amount is the second absolute moisture amount larger than the first absolute moisture amount (resistance of the recording material P is lower) is made larger than the difference between the first target voltage V1 and the second target voltage V2 when the absolute moisture amount is the first absolute moisture amount (refer to Table 2 provided below).

In particular, the resistance value of the recording material P varies depending on various factors (e.g., the grammage, paper quality, absolute moisture amount). In the first exemplary embodiment, a table indicating a relationship between each of the grammage and the absolute moisture amount, and the first and second target voltages V1 and V2 is preliminarily obtained for each type (paper type category (or brand)) of the recording material P, and stored in the ROM 151 of the controller 200. Then, based on the printing information and the detection result of the environment sensor 40, the CPU circuit unit 150 of the controller 200 reads the corresponding first and second target voltages V1 and V2 from the above-described table, and reflects the first and second target voltages V1 and V2 in the control of the secondary transfer voltage.

Tables 1 and 2 each illustrate an example of the above-described table of the first and second target voltages V1 and V2. Table 1 is a table for plain paper, and Table 2 is a table for gloss paper. In the first exemplary embodiment, the controller 200 determines the first and second target voltages V1 and V2 corresponding to a grammage or an absolute moisture amount that does not exist in the table, such as a grammage or an absolute moisture amount between grammages or absolute moisture amounts in the table, by linear interpolation. As indicated in Tables 1 and 2, the above-described control (target value change control) of changing the target voltage of the secondary transfer voltage between the first target voltage V1 and the second target voltage V2 needs not be performed under all conditions. Under a condition under which a secondary transfer defect does not occur, the first target voltage V1 and the second target voltage V2 may be set to the same voltage (in other words, the target value change control needs not be performed). In other words, as indicated in Tables 1 and 2, in the case of forming an image on a preset predetermined recording material P (e.g., the grammage, paper type category (or brand)), the controller 200 can execute the target value change control. As indicated in Tables 1 and 2, when an environmental condition satisfies a preset predetermined condition (e.g., when the absolute moisture amount is larger than or equal to a predetermined threshold value), the controller 200 can execute the target value change control.

TABLE 1

Control table for plain paper

| | Absolute moisture amount | | | | | |
|---|---|---|---|---|---|---|
| | 1.1 g/m³ | | 8.9 g/m³ | | 17.0 g/m³ | |
| Grammage | V1 | V2 | V1 | V2 | V1 | V2 |
| 75 g/m³ | 1150 v | 1150 v | 950 v | 1050 v | 750 v | 900 v |
| 90 g/m³ | 1150 v | 1150 v | 950 v | 1000 v | 750 v | 850 v |

TABLE 1-continued

Control table for plain paper

| | Absolute moisture amount | | | | | |
|---|---|---|---|---|---|---|
| | 1.1 g/m$^3$ | | 8.9 g/m$^3$ | | 17.0 g/m$^3$ | |
| Grammage | V1 | V2 | V1 | V2 | V1 | V2 |
| 120 g/m$^3$ | 1200 v | 1200 v | 900 v | 950 v | 700 v | 800 v |
| 163 g/m$^3$ | 1300 v | 1300 v | 1000 v | 1000 v | 650 v | 750 v |

TABLE 2

Control table for gloss paper

| | Absolute moisture amount | | | | | |
|---|---|---|---|---|---|---|
| | 1.1 g/m$^3$ | | 8.9 g/m$^3$ | | 17.0 g/m$^3$ | |
| Grammage | V1 | V2 | V1 | V2 | V1 | V2 |
| 118 g/m$^3$ | 900 v | 925 v | 700 v | 725 v | 500 v | 525 v |
| 148 g/m$^3$ | 900 v | 925 v | 700 v | 725 v | 500 v | 550 v |
| 216 g/m$^3$ | 900 v | 925 v | 700 v | 750 v | 500 v | 600 v |

As described above, for various recording materials P, substantially constant secondary transferability can be ensured from the leading end of the recording material P to the trailing end thereof, and a secondary transfer defect can be prevented.

6. Effect Confirmation

To confirm an effect of the first exemplary embodiment, a test of checking whether an image defect has occurred was conducted using various recording materials P under a high-temperature and high-humidity environment (temperature 30° C., relative humidity 80%, absolute moisture amount 24.3 g/m$^3$). The test was conducted for the first exemplary embodiment and a comparative example.

Figure 6:
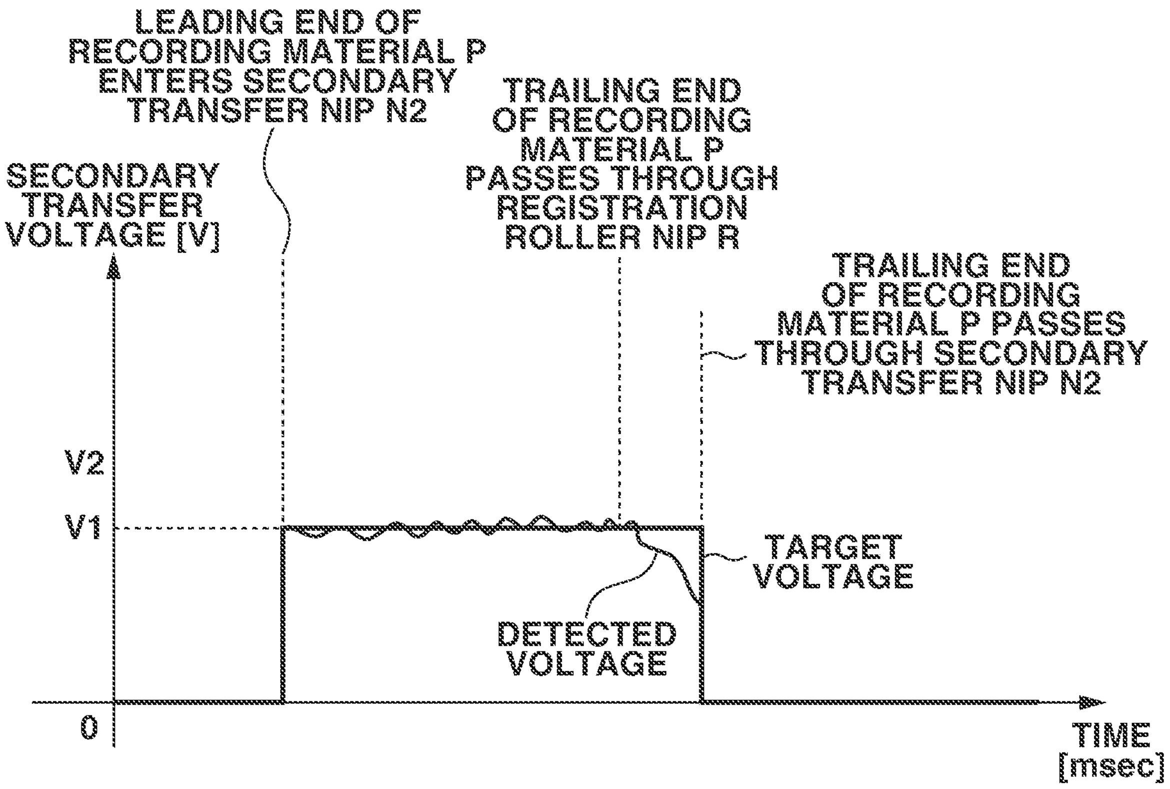
FIG. 6 is a chart illustrating control of a secondary transfer voltage according to a comparative example.

In an image forming apparatus 100 according to the comparative example, as illustrated in FIG. 6, a target voltage of a secondary transfer voltage is kept constant even after the trailing end of the recording material P passes through the registration roller nip R and the orientation of the portion on the trailing end side of the recording material P changes. The configuration and the operation of the image forming apparatus 100 according to the comparative example are substantially the same as the configuration and the operation of the image forming apparatus 100 according to the first exemplary embodiment except for the above-described point.

Table 3 indicates a type (brand, grammage) of the recording material P used in the test, the setting of the first and second target voltages V1 and V2, and a result indicating whether an image defect has occurred. The image defect was evaluated by visually observing a secondary transfer defect (density reduction in an image or image deficiency) in a predetermined test image. A case where an image defect did not occur was indicated as “Pass”, whereas a case where an image defect occurred was indicated as “Fail”.

TABLE 3

| | Recording material P (Product name) | Grammage | V1 | V2 | Occurrence of image defect |
|---|---|---|---|---|---|
| First exemplary embodiment | Vitality75 | 75 g/m$^3$ | 750 V | 900 V | Pass |
| | GF-C081 | 81 g/m$^3$ | 500 V | 550 V | Pass |
| | Xx163 | 163 g/m$^3$ | 650 V | 750 V | Pass |
| | CS060 | 60 g/m$^3$ | 500 V | 550 V | Pass |
| Comparative example | Vitality75 | 75 g/m$^3$ | 750 V | (750 V) | Fail |
| | GF-C081 | 81 g/m$^3$ | 500 V | (500 V) | Fail |
| | Xx163 | 163 g/m$^3$ | 650 V | (650 V) | Fail |
| | CS060 | 60 g/m$^3$ | 500 V | (500 V) | Fail |

In the configuration of the comparative example, the image defect occurred in part of an image obtained subsequent to a timing at which the trailing end of the recording material P passes through the registration roller nip R and the portion on the trailing end side of the recording material P moves to be along the intermediate transfer belt 10, in all of the tests that use the respective recording materials P. It is considered that the image defect has occurred because a large amount of current has flowed to the intermediate transfer belt 10 via the recording material P and the secondary transfer voltage has dropped at the timing as illustrated in FIG. 6.

On the other hand, in the configuration of the first exemplary embodiment, by increasing the target voltage of the secondary transfer voltage at the timing at which the trailing end of the recording material P passes through the registration roller nip R and the portion on the trailing end side of the recording material P moves to be along the intermediate transfer belt 10, the drop in secondary transfer voltage has been prevented. Thus, an image defect has not occurred in all of the tests that use the respective recording materials P.

As described above, in the first exemplary embodiment, the image forming apparatus 100 has a configuration in which the controller 200 acquires information regarding the timing at which the orientation of a portion of the recording material P passing through the secondary transfer nip N2 that is located between the secondary transfer roller 20 and the registration roller pair 60 can change to get closer to the intermediate transfer belt 10, and can execute control of changing, based on the information, a target value of the secondary transfer voltage for secondary transfer onto the recording material P between a first target value for a period anterior to the above-described timing, and a second target value for a period posterior to the above-described timing that is larger in absolute value than the first target value. In particular, in the first exemplary embodiment, the controller 200 can execute control of changing the target value of the secondary transfer voltage for the secondary transfer onto the recording material P so that an absolute value thereof becomes large at a predetermined timing that is based on a timing at which the trailing end in the conveyance direction of the recording material P passing through the secondary transfer nip N2 passes through the contact portion with the registration roller pair 60. The controller 200 can acquire the information regarding the above-described timing based on the information regarding the recording material P. In the first exemplary embodiment, the information regarding the recording material P includes the information regarding a length in the conveyance direction of the recording material P. In the first exemplary embodiment, the information regarding the recording material P includes the information regarding the rigidity of the recording material P. The information regarding the recording material P may include information regarding at least one of grammage, material, category, or brand of the recording material P. The controller 200 can change a change amount of the second target value with respect to the first target value based on information similar to the above-described information regarding the recording material P. The controller 200 can change a change amount of the second target value with respect to the first target value based on the information regarding at least one of temperature or humidity on at least one of the inside or outside of the image forming apparatus 100 (the information regarding an environment). In the first exemplary embodiment, the controller 200 performs the constant voltage control of the secondary transfer voltage, and the target value of the secondary transfer voltage is a target voltage value in the constant voltage control.

In the first exemplary embodiment, in a configuration in which the intermediate transfer belt 10 having conductivity that enables a current flow in the circumferential direction is used, it is possible to prevent the occurrence of a secondary transfer defect attributed to a change in orientation of the portion on the trailing end side of the recording material P in the vicinity on the upstream side of the secondary transfer nip N2 with a simple configuration without involving the upsizing and the cost increase of the image forming apparatus 100. In other words, in the first exemplary embodiment, in the configuration in which the intermediate transfer belt 10 having conductivity that enables a current flow in the circumferential direction is used, it is possible to prevent the occurrence of a transfer defect attributed to the change in orientation of the recording material P conveyed in the vicinity of the secondary transfer nip N2.

7. Modification

Next, a modification of the first exemplary embodiment will be described.

In the first exemplary embodiment, examples of tables (Tables 1 and 2) for determining the target value of the secondary transfer voltage for plain paper and gloss paper have been described. A similar table can be prepared for another recording material such as rough paper and plastic paper, and control similar to that in the first exemplary embodiment can be performed. In addition, with respect to plain paper, for example, different tables may be prepared for different brands, and control similar to that in the first exemplary embodiment can be performed.

In the first exemplary embodiment, the first and second target voltages V1 and V2 corresponding to a grammage or an absolute moisture amount between grammages or absolute moisture amounts in the tables such as Tables 1 and 2 are determined by linear interpolation, but the present disclosure is not limited to such a configuration. For example, the second target voltage V2 (change amount of the second target voltage V2 with respect to the first target voltage V1) may be determined using another interpolation method for a condition under which a drop in secondary transfer voltage is large. For example, the second target voltage V2 may be determined by performing nonlinear interpolation on the second target voltage V2 so that a difference between the first and second target voltages V1 and V2 becomes larger for a condition with a larger drop in secondary transfer voltage.

Figure 7A:
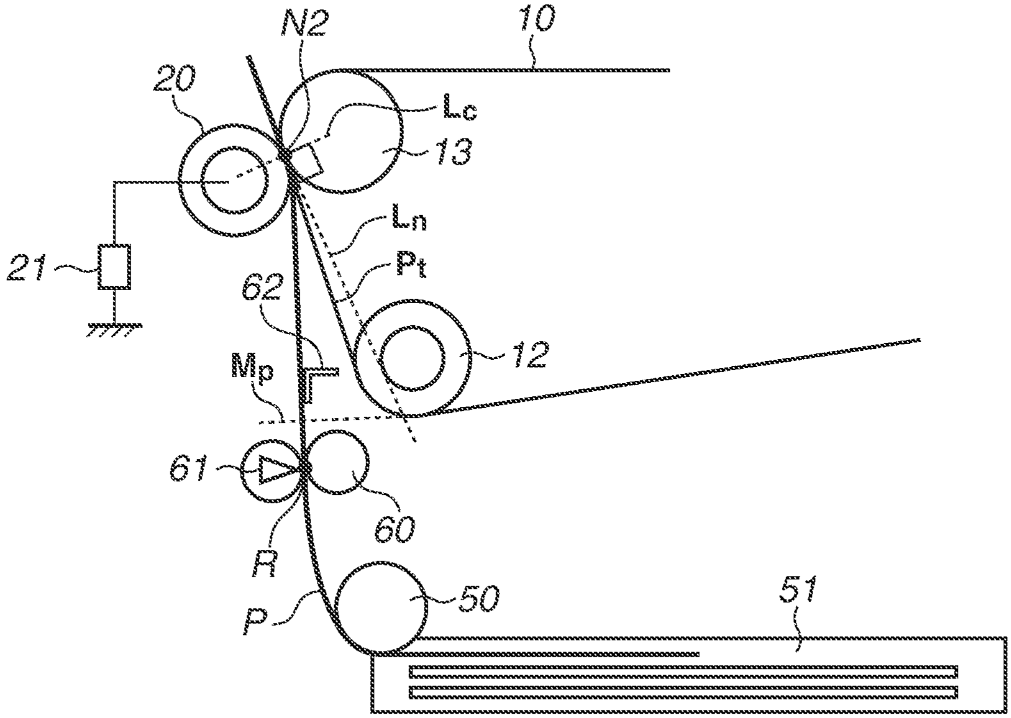
FIGS. 7A and 7B are schematic cross-sectional diagrams illustrating the vicinity of a secondary transfer portion according to a modification.
Figure 7B:
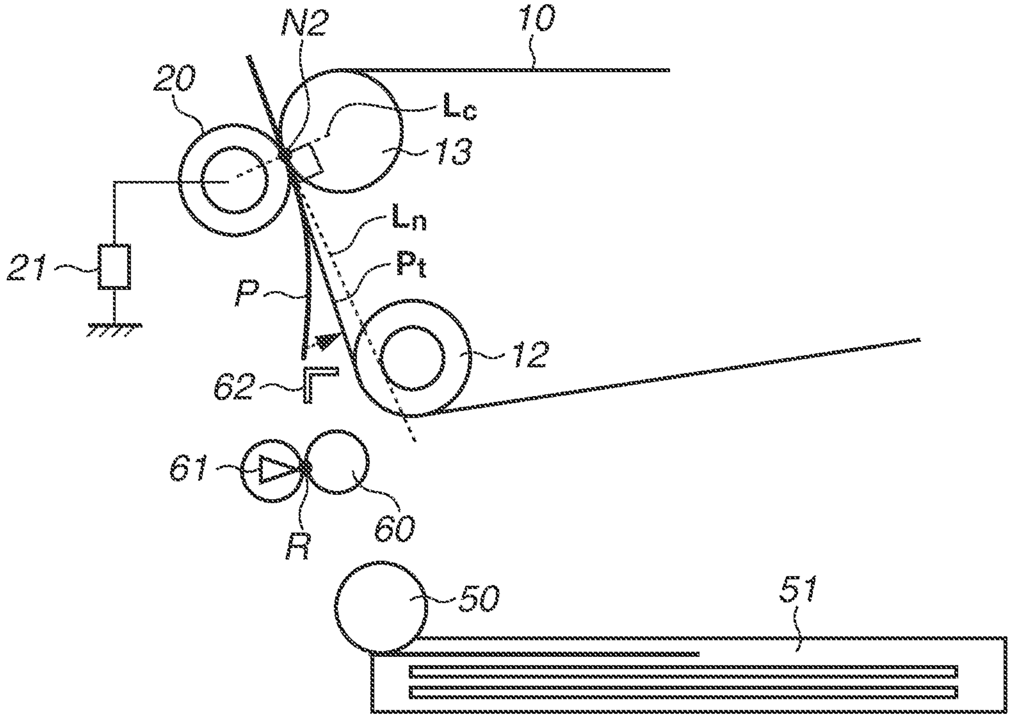

In the first exemplary embodiment, the description has been given of the case where the orientation of the portion on the trailing end side of the recording material P changes at the timing at which the trailing end of the recording material P passes through the registration roller nip R, but the present disclosure is not limited to such a configuration. For example, as illustrated in FIGS. 7A and 7B, the present disclosure can also be applied to a case where the orientation of the portion on the trailing end side of the recording material P changes at the timing at which the trailing end of the recording material P passes through a contact portion with a conveyance guide member 62 serving as a regulation member. FIGS. 7A and 7B are cross-sectional diagrams illustrating the vicinity of the secondary transfer nip N2 according to this example (cross section substantially orthogonal to the rotational axis direction of the secondary transfer roller 20 and the secondary transfer opposing roller 13). In FIGS. 7A and 7B, a component having the same or corresponding function or configuration as a component of the image forming apparatus 100 according to the first exemplary embodiment illustrated in FIG. 1 is assigned the same reference numeral. An image forming apparatus 100 illustrated in FIGS. 7A and 7B includes the conveyance guide member 62 as a regulation member that is arranged on the upstream side of the secondary transfer nip N2 and regulates the orientation of the recording material P being in contact with the secondary transfer roller 20 and the regulation member. The conveyance guide member 62 is configured to regulate movement of the recording material P in a direction getting closer to the intermediate transfer belt 10 (pre-secondary transfer nip stretching surface Pt). FIG. 7A illustrates the conveyance orientation of the recording material P before the trailing end of the recording material P passes through the contact portion with the conveyance guide member 62, and FIG. 7B illustrates the conveyance orientation of the recording material P after the trailing end of the recording material P passes through the contact portion with the conveyance guide member 62. In this example, if the trailing end of the recording material P passes through the contact portion with the conveyance guide member 62 (typically, an end portion on the downstream side of the conveyance guide member 62 in the conveyance direction of the recording material P), the orientation of the portion on the trailing end side of the recording material P in the vicinity of the secondary transfer nip N2 on the upstream side becomes free. Then, by the change in orientation of the recording material P, the portion on the trailing end side of the recording material P moves closer to the intermediate transfer belt 10 to be along the surface of the intermediate transfer belt 10. Thus, in the same way as the first exemplary embodiment, the target voltage of the secondary transfer voltage is to be increased at the timing at which the portion on the trailing end side of the recording material P moves to be along the intermediate transfer belt 10. In other words, the target voltage of the secondary transfer voltage is to be increased at the timing at which the portion on the trailing end side of the recording material P moves to be along the intermediate transfer belt 10 depending on a conveyance path of the recording material P in the image forming apparatus 100.

Figure 8:
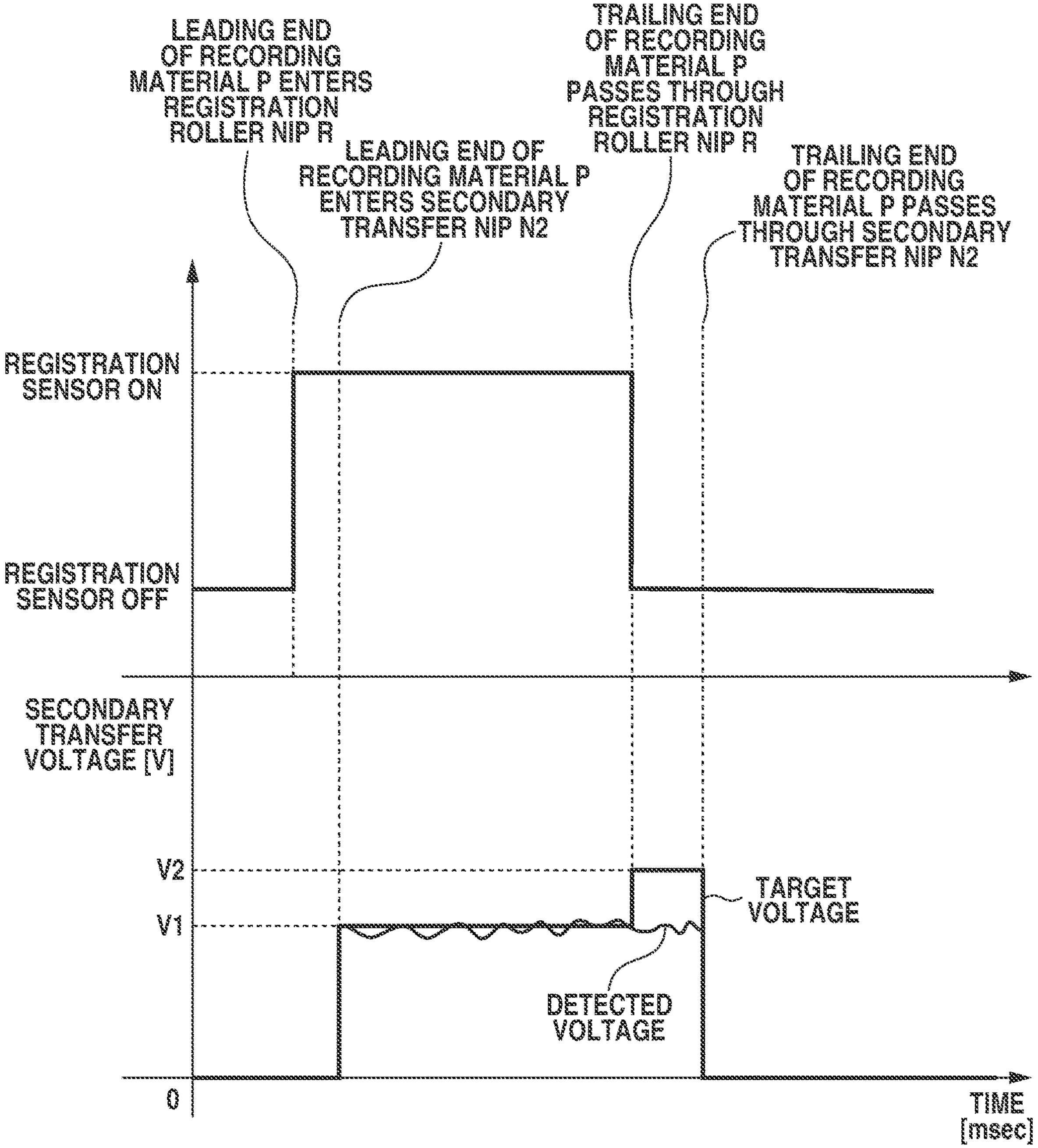
FIG. 8 is a chart illustrating control of a secondary transfer voltage according to another modification.

In the first exemplary embodiment, the timing at which the trailing end of the recording material P passes through the registration roller nip R is predicted based on the printing information input from the host device 300, but the present disclosure is not limited to such a configuration. For example, the timing at which the trailing end of the recording material P passes through the registration roller nip R may be detected by using a detection result of the trailing end of the recording material P that is obtained by the registration sensor 61, and control may be performed to increase the target voltage of the secondary transfer voltage at the timing. FIG. 8 is a chart illustrating the transition of the detection signal of the registration sensor 61, the target voltage of the secondary transfer voltage, and the detected voltage. In this example, the detection signal of the registration sensor 61 is turned on when the leading end of the recording material P enters the registration roller nip R and is turned off when the trailing end of the recording material P passes through the registration roller nip R. Thus, in this example, the controller 200 can detect the timing at which the trailing end of the recording material P passes through the registration roller nip R from a timing at which the detection signal of the registration sensor 61 changes from on to off. For example, in a case where an operator designates a wrong size of the recording material P, or in a case where the recording material P other than a standard-sized sheet is used, in this example, a switching timing of the target voltage of the secondary transfer voltage can be determined based on a detection result of the registration sensor 61. In this manner, by determining the timing of increasing the target voltage of the secondary transfer voltage using the detection result of the registration sensor 61, an effect of preventing a secondary transfer defect irrespective of the size of the recording material P can be obtained more surely.

In the first exemplary embodiment, the target voltage of the secondary transfer voltage is changed at the timing at which the trailing end of the recording material P passes through the registration roller nip R, but the present disclosure is not limited to such a configuration. The target voltage of the secondary transfer voltage is to be changed at the timing at which the portion on the trailing end side of the recording material P moves closer to the intermediate transfer belt 10 by a change in orientation of the portion on the trailing end side of the recording material P to be along the surface of the intermediate transfer belt 10. In other words, the target voltage of the secondary transfer voltage is to be changed at a timing at which a distance between the portion on the trailing end side of the recording material P and the intermediate transfer belt 10 becomes smaller to fall below a predetermined value by the change in orientation of the portion on the trailing end side of the recording material P. For example, at a timing at which a conveyance speed of the recording material P conveyed by the registration roller pair 60 is increased, the portion on the trailing end side of the recording material P may move closer to the intermediate transfer belt 10 by the change in orientation of the portion on the trailing end side of the recording material P to be along the surface of the intermediate transfer belt 10. Thus, the target voltage of the secondary transfer voltage can be changed at a timing earlier or later than the timing, and an effect similar to that of the first exemplary embodiment can be obtained. Also in the case of changing the target voltage of the secondary transfer voltage based on the timing at which the trailing end of the recording material P passes through the registration roller nip R, a change timing of the target voltage of the secondary transfer voltage is not limited to substantially the same timing as the passage timing. The target voltage of the secondary transfer voltage can be changed at a timing shifted to an earlier or later timing from the passage timing, so that a drop in secondary transfer voltage can be sufficiently prevented. For example, as with the target voltage of the secondary transfer voltage, an amount of shift of the timing from the passage timing to an earlier or later timing can be preset based on the type of recording material P or an environment. The same applies to a case where the target voltage of the secondary transfer voltage is changed based on the detection result of the registration sensor 61 as described above, and a change timing of the target voltage of the secondary transfer voltage is not limited to substantially the same timing as the timing at which the registration sensor 61 detects the trailing end of the recording material P. The target voltage of the secondary transfer voltage can be changed at a timing shifted from the detection timing to an earlier or later timing, so that a drop in secondary transfer voltage can be sufficiently prevented. For example, as with the target voltage of the secondary transfer voltage, an amount of shift of the timing from the detection timing to an earlier or later timing can be preset based on the type of recording material P or an environment.

Figure 9A:
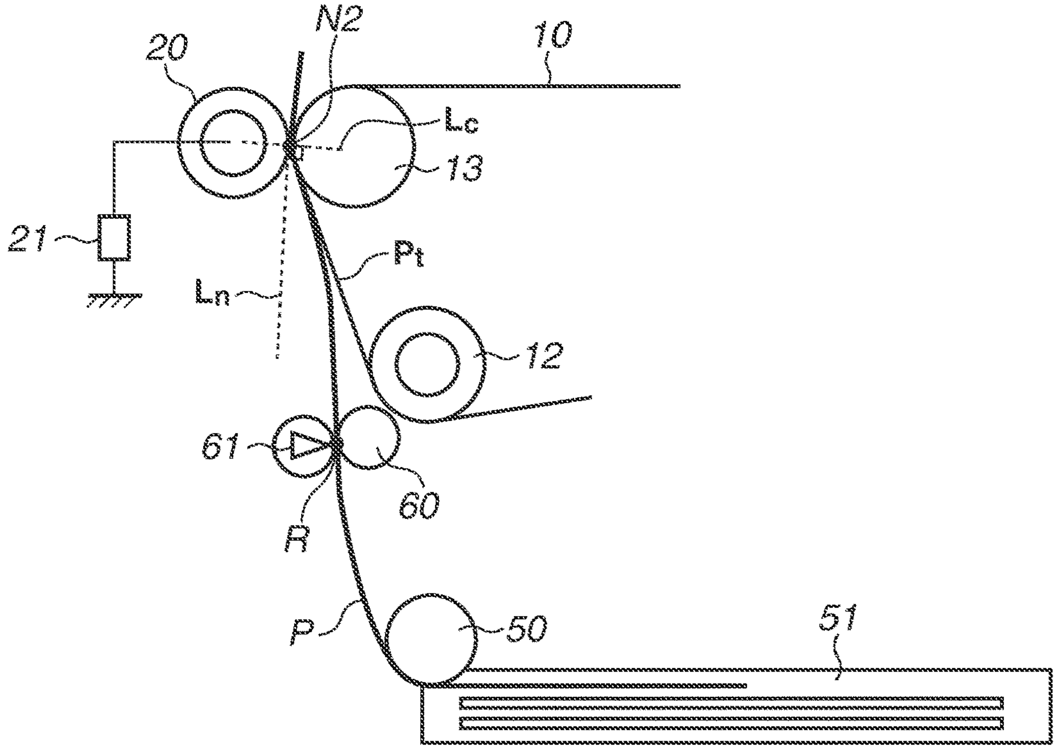
FIGS. 9A and 9B are schematic cross-sectional diagrams illustrating the vicinity of a secondary transfer portion according to another modification.
Figure 9B:
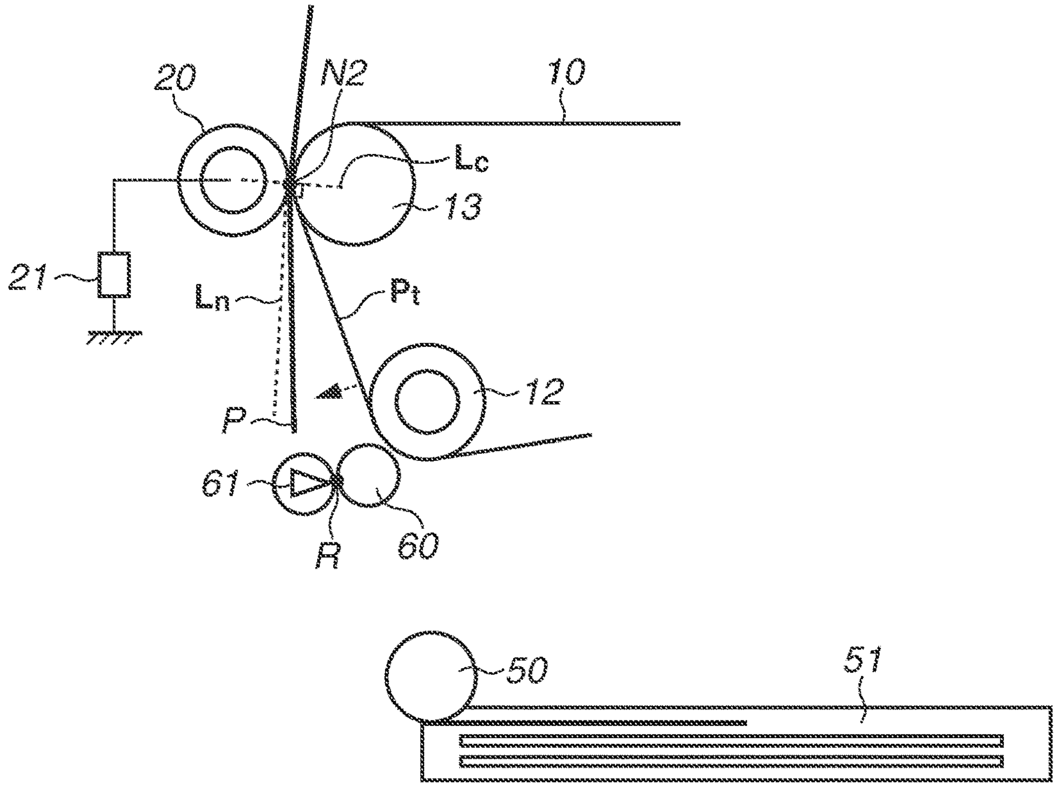

In the first exemplary embodiment, the target voltage of the secondary transfer voltage is increased from the first target voltage V1 to the second target voltage V2 larger in absolute value than the first target voltage V1, but the present disclosure is not limited to such a configuration. Depending on a change configuration of the orientation of the portion on the trailing end side of the recording material P in the image forming apparatus 100, the target voltage of the secondary transfer voltage may be decreased from the first target voltage V1 to a second target voltage V2' smaller in absolute value than the first target voltage V1. Specifically, the following case can be considered. For example, there is a case where, from a state in which the portion on the trailing end side of the recording material P is along the surface of the intermediate transfer belt 10, the conveyance speed of the recording material P conveyed by the registration roller pair 60 is decreased. In this case, because the recording material P becomes loose, the portion on the trailing end side of the recording material P moves away from the intermediate transfer belt 10 by a change in orientation of the portion on the trailing end side of the recording material P and is no longer along the surface of the intermediate transfer belt 10. In this case, because the load on the secondary transfer power source 21 is reduced in contrast to the first exemplary embodiment, the secondary transfer voltage might increase more than expected. If the secondary transfer voltage increases more than expected, an image defect might occur due to an occurrence of abnormal electrical discharge. Thus, in this case, control of decreasing the target voltage of the secondary transfer voltage from the first target voltage V1 to the second target voltage V2' smaller in absolute value than the first target voltage V1 can be performed. In addition, there is a case where the image forming apparatus 100 has a configuration as illustrated in FIGS. 9A and 9B. FIGS. 9A and 9B are cross-sectional diagrams illustrating the vicinity of the secondary transfer nip N2 according to this example (cross section substantially orthogonal to the rotational axis direction of the secondary transfer roller 20 and the secondary transfer opposing roller 13). In FIGS. 9A and 9B, a component having the same or corresponding function or configuration as a component of the image forming apparatus 100 according to the first exemplary embodiment illustrated in FIG. 1 is assigned the same reference numeral. In the image forming apparatus 100 illustrated in FIGS. 9A and 9B, in a cross section substantially orthogonal to the rotational axis direction of the secondary transfer roller 20, the secondary transfer nip tangent line Ln is located closer to the secondary transfer roller 20 (outer roller) than the pre-secondary transfer nip stretching surface Pt. In this case, at the timing at which the trailing end of the recording material P passes through the registration roller nip R, the portion on the trailing end side of the recording material P changes to a separated state from a state of being along the surface of the intermediate transfer belt 10. Then, in this case, because the load on the secondary transfer power source 21 is reduced in contrast to the first exemplary embodiment, the secondary transfer voltage might increase more than expected. Thus, in this case, control of decreasing the target voltage of the secondary transfer voltage from the first target voltage V1 to the second target voltage V2' smaller in absolute value than the first target voltage V1 can be performed. In the case of performing the control of decreasing the target voltage of the secondary transfer voltage, the target voltage of the secondary transfer voltage is to be changed at a timing at which the portion on the trailing end side of the recording material P moves away from the intermediate transfer belt 10 by a change in orientation of the recording material P and is no longer along the surface of the intermediate transfer belt 10. In other words, the target voltage of the secondary transfer voltage is to be changed at a timing at which a distance between the portion on the trailing end side of the recording material P and the intermediate transfer belt 10 becomes larger than a predetermined value by a change in orientation of the portion on the trailing end side of the recording material P. As for the detection and the setting of the change timing of the target voltage of the secondary transfer voltage, the description in the first exemplary embodiment and the description in the modification about the case of increasing the target voltage of the secondary transfer voltage can be similarly applied to the case of decreasing the target voltage of the secondary transfer voltage.

In the first exemplary embodiment, the target value of the voltage to be applied to the secondary transfer roller 20 from the secondary transfer power source 21 is changed relative to the primary transfer voltage (potential of the secondary transfer opposing roller 13) maintained at a constant voltage of +100 V. The target value of the secondary transfer voltage being a potential difference between the secondary transfer roller 20 and the secondary transfer opposing roller 13 is thereby changed. Nevertheless, the present disclosure is not limited to such a configuration. The target value of the secondary transfer voltage being a potential difference between the secondary transfer roller 20 and the secondary transfer opposing roller 13 may be changed by changing the primary transfer voltage (potential of the secondary transfer opposing roller 13). Alternatively, both of the potentials of the secondary transfer roller 20 (voltage to be applied to the secondary transfer roller 20 from the secondary transfer power source 21) and the secondary transfer opposing roller 13 (voltage to be applied to the primary transfer roller 14 from the primary transfer power source 15) may be changed. This example can be employed in a configuration in which secondary transfer is performed at a timing different from that of primary transfer.

Figure 10:
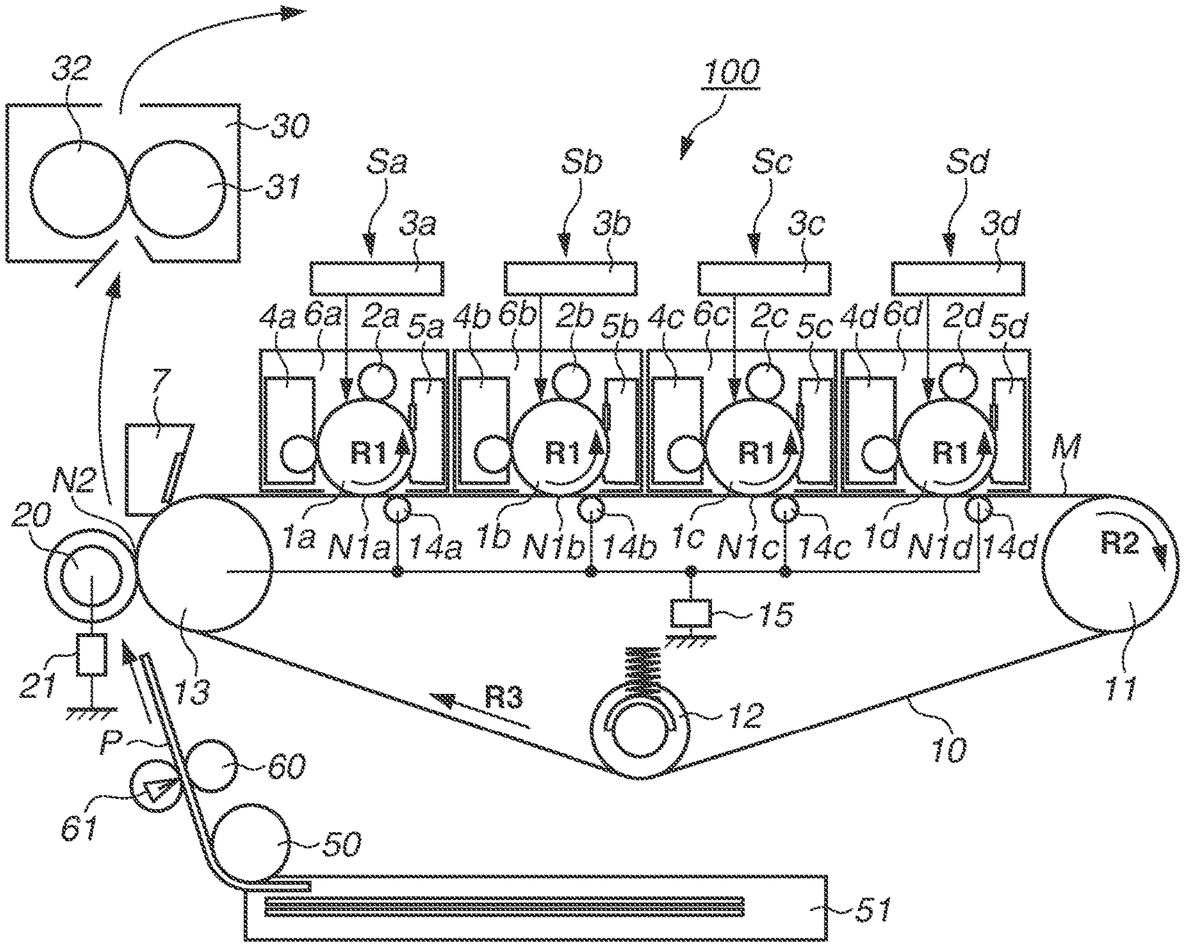
FIG. 10 is a schematic cross-sectional diagram of an image forming apparatus according to another modification.

In the first exemplary embodiment, voltages are applied from the individual primary transfer power sources 15 to the respective primary transfer rollers 14, but the present disclosure is not limited to such a configuration. The voltages may be applied from a common primary transfer power source 15 to all or a part of the plurality of primary transfer rollers 14. FIG. 10 is a schematic cross-sectional diagram of the image forming apparatus 100 according to this example. In FIG. 10, a component having the same or corresponding function or configuration as a component of the image forming apparatus 100 according to the first exemplary embodiment illustrated in FIG. 1 is assigned the same reference numeral. In the image forming apparatus 100 illustrated in FIG. 10, the primary transfer rollers 14*a*, 14*b*, 14*c*, and 14*d* are connected to the common primary transfer power source (high-voltage power source circuit) 15. In this example, the secondary transfer opposing roller 13 is connected to the above-described common primary transfer power source 15. In this example, the driving roller 11 and the tension roller 12 are electrically floating. A configuration in which the secondary transfer opposing roller 13 is electrically floating without being connected to the above-described common primary transfer power source 15, or a configuration in which at least one of the driving roller 11 or the tension roller 12 is further connected to the above-described common primary transfer power source 15 is also conceivable. Also with such a configuration, as with the first exemplary embodiment, at the time of image formation (at the time of primary transfer, at the time of secondary transfer), the primary transfer rollers 14 and the secondary transfer opposing roller 13 are maintained at a predetermined potential (for example, +100 V), and the primary transfer potentials at the primary transfer nips N1 are maintained at a predetermined potential. In this example, by reducing the number of primary transfer power sources 15, the configuration of the image forming apparatus 100 can be simplified, and cost saving can be achieved.

Figure 11:
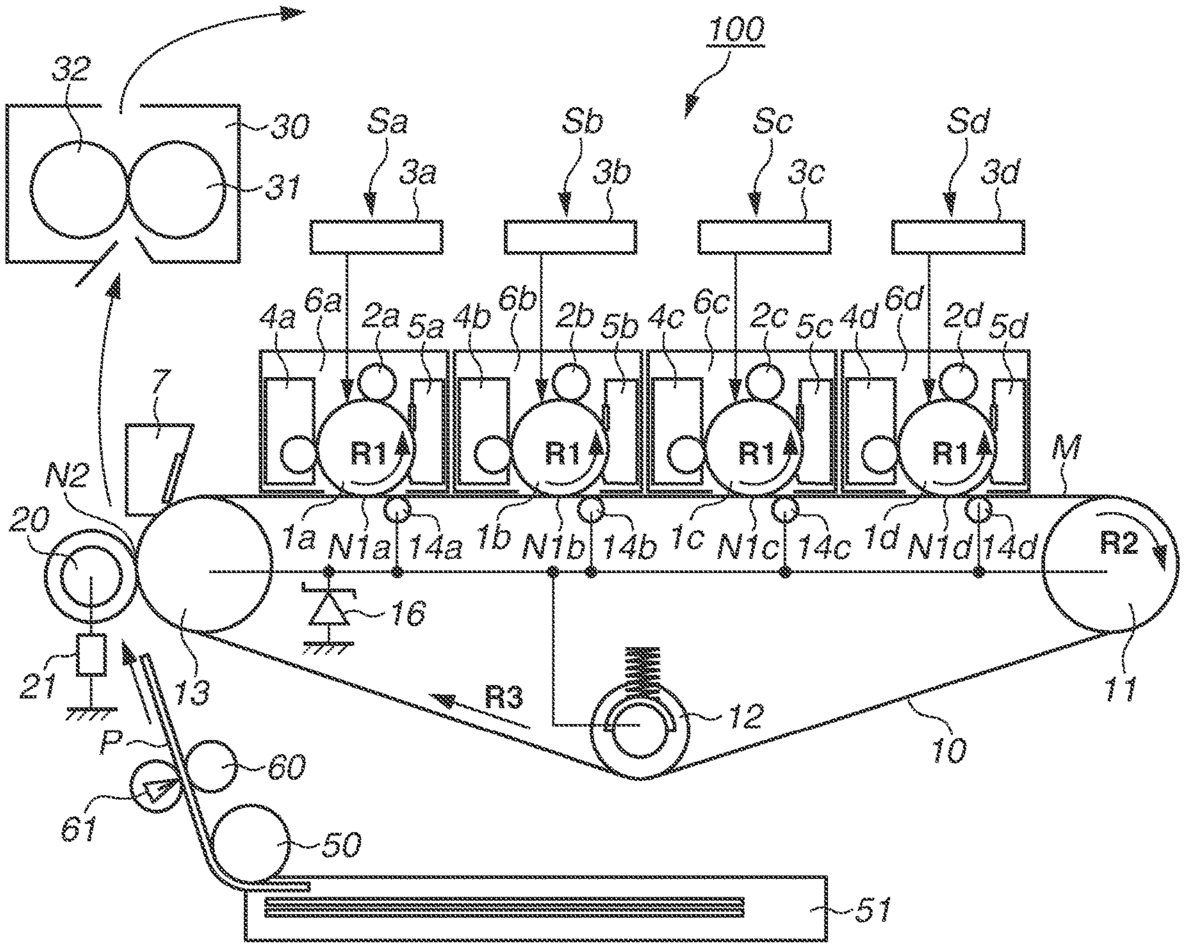
FIG. 11 is a schematic cross-sectional diagram of an image forming apparatus according to another modification.

In the first exemplary embodiment, the primary transfer voltage is applied by providing the primary transfer power source 15, but the present disclosure is not limited to such a configuration. In the case of using the intermediate transfer belt 10 having conductivity that enables a current flow in the circumferential direction, the secondary transfer power source 21 can be used as a power source for supplying the primary transfer current, without providing the primary transfer power source 15. FIG. 11 is a schematic cross-sectional diagram of the image forming apparatus 100 according to this example. In FIG. 11, a component having the same or corresponding function or configuration as a component of the image forming apparatus 100 according to the first exemplary embodiment illustrated in FIG. 1 is assigned the same reference numeral. In the image forming apparatus 100 illustrated in FIG. 11, the secondary transfer opposing roller 13, the driving roller 11, and the tension roller 12 are electrically grounded (connected to the ground) via a zener diode 16 being a voltage maintaining element serving as a voltage maintaining unit (voltage stabilization unit). On the inner circumferential surface side of the intermediate transfer belt 10, the primary transfer rollers 14 each serving as a contact member that is in contact with the inner circumferential surface of the intermediate transfer belt 10 are arranged between the secondary transfer opposing roller 13 and the driving roller 11 so as to correspond to the respective photosensitive drums 1. The configuration and arrangement of the primary transfer rollers 14 are similar to those of the first exemplary embodiment. Then, the primary transfer rollers 14 are electrically grounded (connected to the ground) via the above-described zener diode 16. The zener diode 16 being a constant voltage element is an element that maintains a predetermined voltage (zener voltage) by flowing a current, and when a current larger than or equal to a fixed value flows, a zener voltage is generated on a cathode side. In other words, one end side (anode side) of the zener diode 16 is connected to the ground, and the other end side (cathode side) thereof is connected to the secondary transfer opposing roller 13, the driving roller 11, the tension roller 12, and the primary transfer rollers 14. By a voltage being applied from the secondary transfer power source 21 to the secondary transfer roller 20, the secondary transfer opposing roller 13 and the primary transfer rollers 14 (furthermore, the driving roller 11 and the tension roller 12) are maintained at the zener voltage. In this example, a current flows from the primary transfer rollers (metal rollers) 14 arranged in the vicinity of the respective photosensitive drums 1 and maintained at the zener voltage to the respective photosensitive drums 1 via the intermediate transfer belt 10. Toner images are thereby primarily transferred onto the intermediate transfer belt 10 from the photosensitive drums 1. In this example, the secondary transfer roller 20 constitutes a current supply member that comes in contact with the intermediate transfer belt 10 at a position different from that of the photosensitive drum 1, flows a current in the circumferential direction of the intermediate transfer belt 10 by receiving an applied voltage, and primarily transfers a toner image from the photosensitive drum 1 onto the intermediate transfer belt 10. A configuration in which at least one of the secondary transfer opposing roller 13, the driving roller 11, or the tension roller 12 is electrically floating without being connected to the zener diode 16 is also conceivable. As described above, since an absolute value of the zener voltage of the zener diode 16 becomes the primary transfer voltage, the primary transfer voltage can be maintained constant without providing the primary transfer power source 15 as in the first exemplary embodiment. In this example, downsizing and cost saving of the image forming apparatus 100 can be achieved. In this example, it is sufficient that the target voltage of the secondary transfer voltage to be applied to the secondary transfer roller 20 is controlled relative to the primary transfer voltage (potential of the secondary transfer opposing roller 13) determined as described above in the same way as in the configuration of the first exemplary embodiment or the modification described herein. In this example, the zener diode is used as the voltage maintaining element, but the voltage maintaining element is not limited to this. Any element can be used as long as the element can obtain a similar effect. For example, a resistive element or a varistor being a constant voltage element can also be used. The primary transfer power source 15 according to the first exemplary embodiment can also be regarded as a voltage maintaining unit (voltage stabilization unit) for maintaining voltages of the primary transfer roller 14 and the secondary transfer opposing roller 13.

In the first exemplary embodiment, the target voltage of the secondary transfer voltage is changed in two steps, i.e., the first target voltage V1 and the second target voltage V2, but the present disclosure is not limited to such a configuration. For example, in the case of a configuration in which a distance (contact state) between the portion on the trailing end side of the recording material P and the intermediate transfer belt 10 changes in steps, the target voltage of the secondary transfer voltage may be changed in multiple steps of three or more steps. Also in this case, at least one of target voltages of the secondary transfer voltage corresponds to a target voltage in a period before the trailing end of the recording material P passes through the contact portion with the regulation member (e.g., the registration roller pair 60). In addition, at least one of the target voltages of the secondary transfer voltage corresponds to a target voltage in a period after the trailing end of the recording material P passes through the contact portion with the regulation member.

In the first exemplary embodiment, as the target value of the secondary transfer voltage, the target voltage value of the secondary transfer voltage to be applied in a case where the secondary transfer voltage is subjected to constant voltage control is changed, but the present disclosure is not limited to such a configuration. As the target value of the secondary transfer voltage, a target current value of the secondary transfer current to be applied in a case where the secondary transfer voltage is subjected to constant current control may be changed. In this case, the secondary transfer power source 21 includes a current detection unit (ammeter) that detects a current flowing at the secondary transfer nip N2 by applying a voltage to the secondary transfer roller 20. The current detection unit detects the current flowing at the secondary transfer nip N2 at a predetermined cycle (current detection cycle) at the time of image formation (at the time of secondary transfer). Then, based on a difference between a preset target current value and a detected current value detected by the current detection unit, the secondary transfer control unit 202 determines a voltage to be applied to the secondary transfer roller 20 from the secondary transfer power source 21 in the next current detection cycle. In other words, the secondary transfer control unit 202 adjusts the voltage to be applied to the secondary transfer roller 20 in the next current detection cycle so that the detected current value becomes closer to the target current value. With this configuration, the secondary transfer voltage to be applied to the secondary transfer roller 20 from the secondary transfer power source 21 is controlled so that the current flowing at the secondary transfer nip N2 becomes substantially constant. The control of adjusting an output of a power source so that a value of a flowing current becomes closer to the target current value in this manner is referred to as the constant current control. In the case of performing the constant current control of the secondary transfer voltage in this manner, by controlling the target current value in place of the target voltage value that is controlled in the first exemplary embodiment or the modification described herein so that substantially constant secondary transferability is obtained, a similar effect can be obtained.

The effect of the first exemplary embodiment becomes more prominent as the resistance in the circumferential direction of the intermediate transfer belt 10 becomes lower. In the first exemplary embodiment, the resistance value in the circumferential direction of the intermediate transfer belt 10 is $1\times10^{8}\Omega$. In the case of using the intermediate transfer belt 10 having a further lower resistance value in the circumferential direction, a change in secondary transfer current at the secondary transfer nip N2 that is attributed to a change in orientation of the portion on the trailing end side of the recording material P becomes larger. Thus, the effect of the first exemplary embodiment becomes more prominent. In particular, in a case where a conductive layer (e.g., a resistance value in the circumferential direction thereof is about $1\times10^{6}\Omega$ or less) exists on the innermost surface of the intermediate transfer belt 10, the case is equivalent to a case where an electrode exists on the inner circumferential surface of the intermediate transfer belt 10. Thus, by a capacitance change between before and after the portion on the trailing end side of the recording material P moves to be along the intermediate transfer belt 10, it becomes easier for a current to flow to the intermediate transfer belt 10 via the recording material P, and a drop in the secondary transfer voltage becomes more likely to occur. Thus, in the case where the conductive layer exists on the innermost surface of the intermediate transfer belt 10, the effect of the first exemplary embodiment becomes more prominent. In a case where the intermediate transfer belt 10 includes a plurality of layers, if an electric resistance of an innermost layer is lower than an electric resistance of other layers, the effect of the first exemplary embodiment becomes more prominent.

Next, another exemplary embodiment of the present disclosure will be described. A basic configuration and an operation of an image forming apparatus according to a second exemplary embodiment are the same as those of the image forming apparatus according to the first exemplary embodiment. Thus, in the image forming apparatus according to the second exemplary embodiment, a component having the same or corresponding function or configuration as a component of the image forming apparatus according to the first exemplary embodiment is assigned the same reference numeral as that in the first exemplary embodiment, and the detailed description thereof will be omitted.

1. Configuration of Second Exemplary Embodiment

In the first exemplary embodiment, at the timing at which the trailing end of the recording material P passes through the registration roller nip R, the target voltage of the secondary transfer voltage is rapidly increased. In other words, in the first exemplary embodiment, the controller 200 performs control to change the target voltage of the secondary transfer voltage from the first target voltage V1 to the second target voltage V2 at once. In contrast, in the second exemplary embodiment, the target voltage of the secondary transfer voltage is gradually changed as the portion on the trailing end side of the recording material P gradually moves to be along the surface of the intermediate transfer belt 10 after the trailing end of the recording material P passes through the registration roller nip R.

Figure 12:
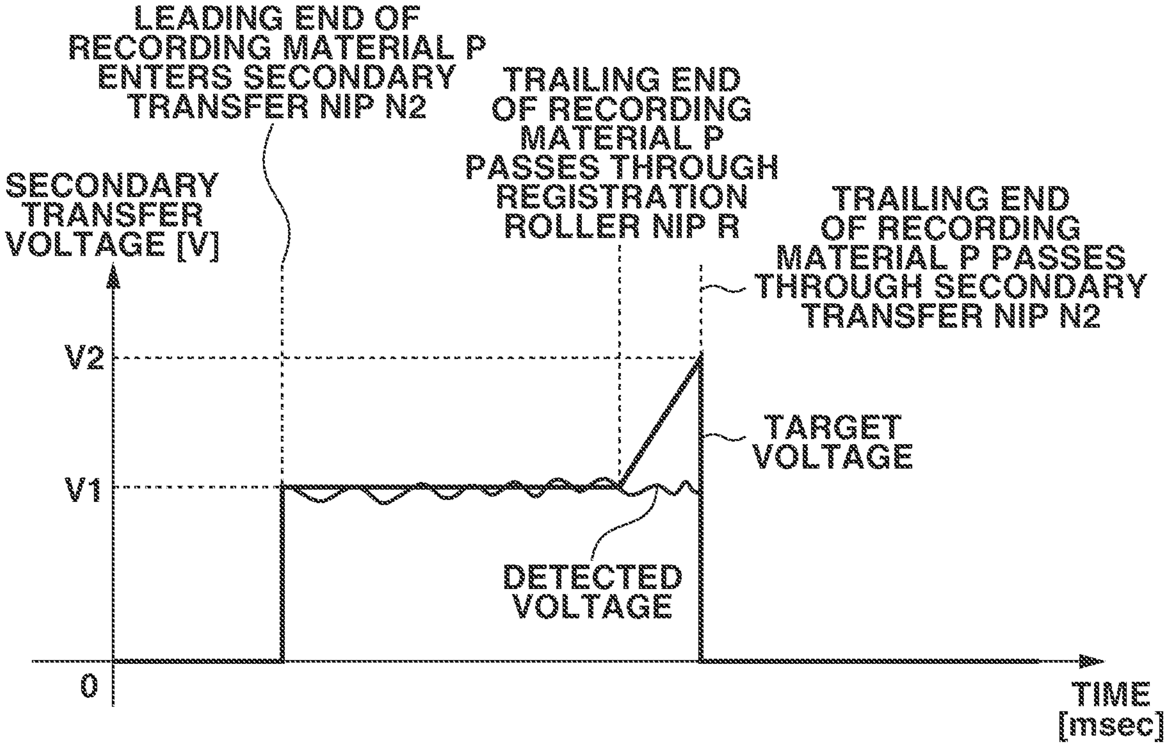
FIG. 12 is a chart illustrating control of a secondary transfer voltage according to a second exemplary embodiment.

FIG. 12 is a chart illustrating control of the secondary transfer voltage according to the second exemplary embodiment. FIG. 12 illustrates transitions of the target voltage in the control of the secondary transfer voltage that is performed by the secondary transfer control unit 202 and the detected voltage being an actual output value of the secondary transfer power source 21 that is detected by the voltage detection unit, from when the recording material P enters the secondary transfer nip N2 to when the secondary transfer process ends.

In the second exemplary embodiment, based on the information regarding a size of the recording material P in the information regarding the recording material P that is included in the printing information input from the host device 300, the controller 200 predicts a timing at which the trailing end of the recording material P passes through the registration roller nip R. In other words, the controller 200 predicts a timing at which the trailing end of the recording material P becomes free. After that, during a period from when the leading end of the recording material P enters the secondary transfer nip N2 to when the trailing end of the recording material P passes through the registration roller nip R, the controller 200 controls the secondary transfer control unit 202 to apply the secondary transfer voltage to the secondary transfer roller 20 from the secondary transfer power source 21 by setting the target voltage of the secondary transfer voltage to the first target voltage V1. Then, the controller 200 controls the secondary transfer control unit 202 to start to increase the target voltage of the secondary transfer voltage at a timing at which the trailing end of the recording material P passes through the registration roller nip R, and gradually increase the target voltage of the secondary transfer voltage so that the target voltage reaches the second target voltage V2 before the trailing end of the recording material P passes through the secondary transfer nip N2. At this time, in the second exemplary embodiment, the controller 200 performs control to linearly change the target voltage of the secondary transfer voltage from the first target voltage V1 to the second target voltage V2. With this configuration, it is possible prevent a drop in secondary transfer voltage that gradually changes to suitably deal with a change in state of the portion on the trailing end side of the recording material P that gradually moves to be along the surface of the intermediate transfer belt 10 after the trailing end of the recording material P passes through the registration roller nip R.

As described above, in the second exemplary embodiment, in the configuration in which the orientation of the portion on the trailing end side of the recording material P gradually changes, by performing control that suitably deals with the change in orientation, an effect similar to the effect described in the first exemplary embodiment can be obtained.

2. Modification

Next, a modification of the second exemplary embodiment will be described.

Figure 13:
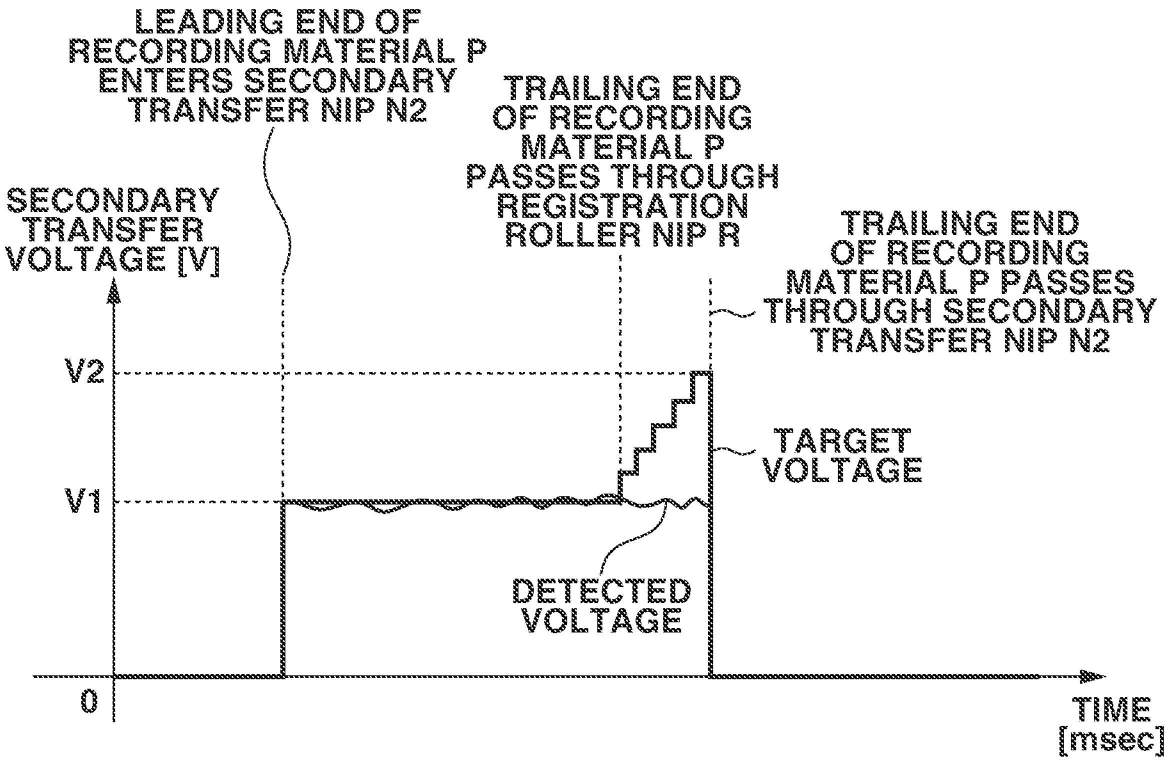
FIG. 13 is a chart illustrating control of a secondary transfer voltage according to a modification.

In the second exemplary embodiment, the target voltage of the secondary transfer voltage is linearly changed from the first target voltage V1 to the second target voltage V2, but the present disclosure is not limited to such a configuration. For example, as illustrated in FIG. 13, the controller 200 may perform control to change the target voltage of the secondary transfer voltage from the first target voltage V1 to the second target voltage V2 in steps. In a case where the recording material P has small rigidity (e.g., thin paper), when the recording material P passes through the registration roller nip R, because springiness of the recording material P is weak and a rapid orientation change amount is small, the recording material P may gradually move to be along the intermediate transfer belt 10. In such a case, as described above, it may be desirable to perform control of changing the target voltage of the secondary transfer voltage in steps. Moreover, in a case where the recording material P is label paper, thickness, resistance, rigidity, or paper quality may vary discontinuously within the surface of the recording material P. In such a case, it may be desirable to change the target voltage of the secondary transfer voltage in steps as described above.

Figure 14:
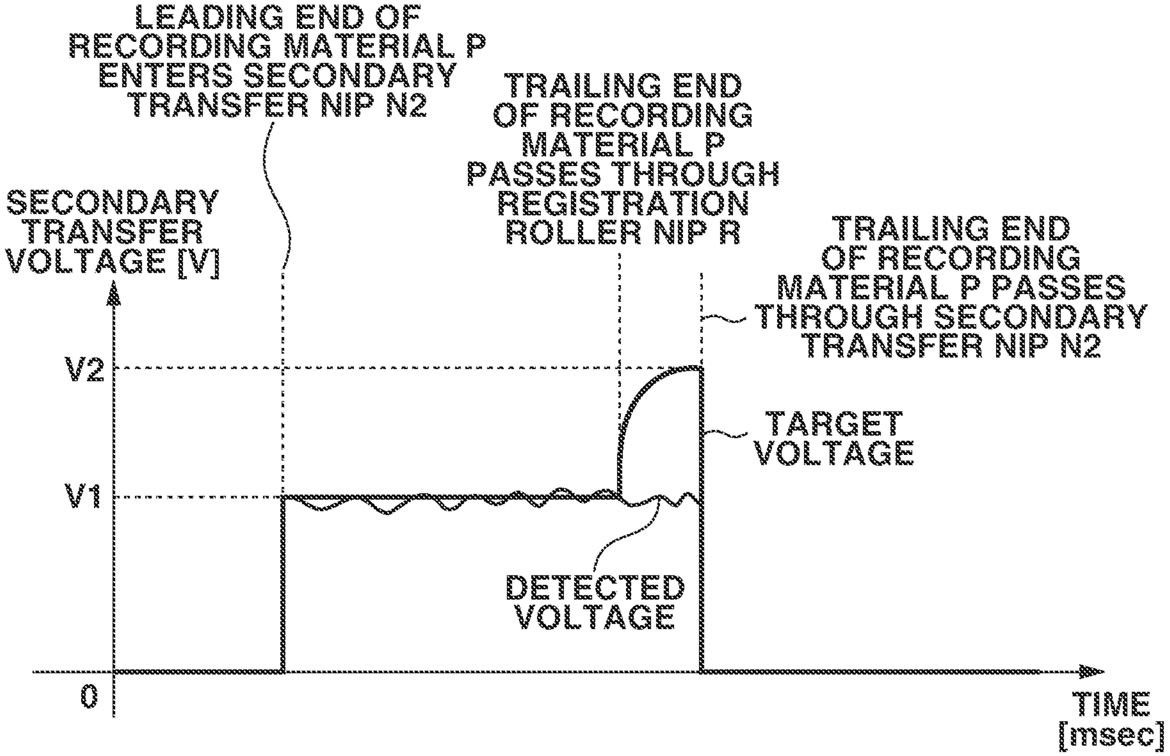
FIG. 14 is a chart illustrating control of a secondary transfer voltage according to another modification.

In addition, for example, as illustrated in FIG. 14, the controller 200 may perform control to nonlinearly and continuously change the target voltage of the secondary transfer voltage from the first target voltage V1 to the second target voltage V2. In a case where the recording material P has high rigidity (e.g., thick paper), the following change is performed. More specifically, due to springiness of the recording material P, the leading end of the portion on the trailing end side of the recording material P swiftly moves to be along the intermediate transfer belt 10 at the instant of passage through the registration roller nip R, and then, the recording material P gradually moves to be along the intermediate transfer belt 10 toward the rearmost trailing end. In such a case, it may be more desirable to perform control of nonlinearly and continuously changing the target voltage of the secondary transfer voltage from the first target voltage V1 to the second target voltage V2 as described above. More specifically, the target voltage of the secondary transfer voltage is initially increased at a relatively large increase rate, and then, the increase rate is gradually decreased. In this case, a change configuration of the slope of a change in target voltage of the secondary transfer voltage can be varied based on the rigidity of the recording material P.

The control of the second exemplary embodiment and the control of the above-described modification may be combined with the configuration of the modification described in the first exemplary embodiment.

Heretofore, the present disclosure has been described based on specific exemplary embodiments, but the present disclosure is not limited to the above-described exemplary embodiments.

In the above-described exemplary embodiments, the primary transfer member (contact member) is a roller-shaped member formed of metal being a conductive material, but the conductive material is not limited to metal, and the primary transfer member is not limited to a roller-shaped member. The primary transfer member (contact member) may be a roller-shaped member including an elastic layer formed of conductive resin or rubber, a sheet-shaped member formed of conductive resin, or a brush-shaped member including conductive brush fibers.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-155905, filed Sep. 16, 2020, which is hereby incorporated by reference herein in its entirety.

What is claimed is:

1. An image forming apparatus comprising:

a photosensitive drum configured to bear a toner image;

an intermediate transfer belt that is endless and is configured to form a primary transfer portion by being in contact with the photosensitive drum, wherein, when transferred, the toner image is primarily transferred onto the intermediate transfer belt from the photosensitive drum at the primary transfer portion;

a plurality of stretching rollers that includes an inner roller and is configured to stretch the intermediate transfer belt;

an outer roller configured to form a secondary transfer portion by being in contact with the intermediate transfer belt at a position facing the inner roller, and configured to secondarily transfer the toner image from the intermediate transfer belt onto a recording material at the secondary transfer portion;

a power source configured to apply a voltage to the outer roller;

a registration roller arranged upstream of the secondary transfer portion in a conveyance direction of the recording material, wherein the registration roller is configured to regulate orientation of the recording material by being in contact with the outer roller and the registration roller; and a control unit configured to control a secondary transfer voltage to be output by the power source for a secondary transfer, wherein the intermediate transfer belt has conductivity enabling a current flow in a circumferential direction, and wherein, in the conveyance direction of the recording material, the control unit controls to acquire information regarding a timing at which the recording material passes through a contact portion with the registration roller, and controls, based on the acquired information, a target value of the secondary transfer voltage for the secondary transfer to the recording material to be a first target value at a timing at which a leading edge of the recording material comes into contact with the secondary transfer portion, and a second target value of the secondary transfer voltage applied at a timing before a trailing end of the recording material comes into contact with the secondary transfer portion and after a timing at which the trailing end of the recording material passes through the contact portion with the registration roller, which has an absolute value larger than the first target value.

2. The image forming apparatus according to claim 1, wherein, in a cross section substantially orthogonal to a rotational axis direction of the outer roller, in a case where (i) a straight line connecting a rotational center of the inner roller and a rotational center of the outer roller is defined as a nip center line, (ii) a straight line being orthogonal to the nip center line and passing through a contact point of the intermediate transfer belt on the nip center line and the outer roller is defined as a nip tangent line, and (iii) a stretching surface of the intermediate transfer belt formed by the inner roller and the plurality of stretching rollers arranged adjacently to the inner roller on an upstream side of the inner roller in a moving direction of the intermediate transfer belt is defined as a pre-nip stretching surface, the nip tangent line is located closer to the inner roller than the pre-nip stretching surface.

3. The image forming apparatus according to claim 1, wherein the control unit is configured to control to change a change amount of the second target value relative to the first target value based on information regarding the recording material.

4. The image forming apparatus according to claim 1, wherein the control unit is configured to control to acquire the information regarding the timing based on information regarding the recording material.

5. The image forming apparatus according to claim 4, wherein the information regarding the recording material includes information regarding a length in the conveyance direction of the recording material.

6. The image forming apparatus according to claim 4, wherein the information regarding the recording material includes information regarding rigidity of the recording material.

7. The image forming apparatus according to claim 4, wherein the information regarding the recording material includes information regarding at least one of a grammage, a material, a category, or a brand of the recording material.

8. The image forming apparatus according to claim 1, wherein the control unit controls to acquire the information regarding the timing based on a detection result of a sensor that is arranged on a conveyance path of the recording material and is configured to detect the trailing end in the conveyance direction of the recording material.

9. The image forming apparatus according to claim 1, wherein the timing in the information regarding the timing is the timing at which the trailing end in the conveyance direction of the recording material passes through the contact portion with the registration roller.

10. The image forming apparatus according to claim 1, wherein the registration roller is configured to convey the recording material to the secondary transfer portion.

11. The image forming apparatus according to claim 1, wherein the registration roller is configured to convey the recording material to the secondary transfer portion, and wherein the control unit is configured to control to acquire the information regarding the timing based on a timing at which a conveyance speed of the recording material conveyed by conveyance member changes.

12. The image forming apparatus according to claim 1, wherein the timing before the trailing end of the recording material comes into contact with the secondary transfer portion and after the timing at which the trailing end of the recording material passes through the contact portion with the registration roller is a timing at which a second portion of the recording material located between the outer roller and the registration roller becomes substantially parallel to a surface of the intermediate transfer belt.

13. The image forming apparatus according to claim 1, wherein the control unit is configured to control to change a change amount of the second target value relative to the first target value based on information regarding at least one of temperature or humidity on at least one of an inside or an outside of the image forming apparatus.

14. The image forming apparatus according to claim 1, wherein the control unit is configured to control to change the target value of the secondary transfer voltage from the first target value to the second target value at once.

15. The image forming apparatus according to claim 1, wherein the control unit is configured to control to gradually change the target value of the secondary transfer voltage from the first target value to the second target value.

16. The image forming apparatus according to claim 15, wherein the control unit is configured to control to linearly change the target value of the secondary transfer voltage from the first target value to the second target value.

17. The image forming apparatus according to claim 15, wherein the control unit is configured to control to change the target value of the secondary transfer voltage from the first target value to the second target value in steps.

18. The image forming apparatus according to claim 15, wherein the control unit is configured to control to nonlinearly and continuously change the target value of the secondary transfer voltage from the first target value to the second target value.

19. The image forming apparatus according to claim 1, wherein the control unit is configured to perform constant voltage control of the secondary transfer voltage, and the target value of the secondary transfer voltage is a target voltage value in the constant voltage control.

20. The image forming apparatus according to claim 1, wherein the control unit is configured to perform constant current control of the secondary transfer voltage, and the target value of the secondary transfer voltage is a target current value in the constant current control.

21. The image forming apparatus according to claim 1, wherein an electric resistance in the circumferential direction of the intermediate transfer belt corresponding to a length of 100 millimeter (mm) in the circumferential direction is 1×109 ohms (Ω) or less.

22. An image forming apparatus comprising:

a photosensitive drum configured to bear a toner image;

an intermediate transfer belt that is endless and is configured to form a primary transfer portion by being in contact with the photosensitive drum, wherein, when transferred, the toner image is primarily transferred onto the intermediate transfer belt from the photosensitive drum at the primary transfer portion;

a plurality of stretching rollers that includes an inner roller and is configured to stretch the intermediate transfer belt;

an outer roller configured to form a secondary transfer portion by being in contact with the intermediate transfer belt at a position facing the inner roller, and configured to secondarily transfer the toner image from the intermediate transfer belt onto a recording material at the secondary transfer portion;

a power source configured to apply a voltage to the outer roller;

a registration roller arranged upstream of the secondary transfer portion in a conveyance direction of the recording material, wherein the registration roller is configured to regulate orientation of the recording material by being in contact with the outer roller and the registration roller; and a control unit configured to control a secondary transfer voltage to be output by the power source for a secondary transfer, wherein the intermediate transfer belt has conductivity enabling a current flow in a circumferential direction, and wherein, at a timing at which a trailing end in the conveyance direction of the recording material passing through the secondary transfer portion passes through a contact portion with the registration roller, the control unit controls a target value of the secondary transfer voltage for the secondary transfer onto the recording material so that an absolute value becomes large.

23. The image forming apparatus according to claim 22, wherein, in a cross section substantially orthogonal to a rotational axis direction of the outer roller, in a case where (i) a straight line connecting a rotational center of the inner roller and a rotational center of the outer roller is defined as a nip center line, (ii) a straight line being orthogonal to the nip center line and passing through a contact point of the intermediate transfer belt on the nip center line and the outer roller is defined as a nip tangent line, and (iii) a stretching surface of the intermediate transfer belt formed by the inner roller and the plurality of stretching rollers arranged adjacently to the inner roller on an upstream side of the inner roller in a moving direction of the intermediate transfer belt is defined as a pre-nip stretching surface, the nip tangent line is located closer to the inner roller than the pre-nip stretching surface.

* * * * *